United States Patent
Toyama et al.

(10) Patent No.: US 8,477,275 B2
(45) Date of Patent: Jul. 2, 2013

(54) OPTICAL FILM AND LIQUID CRYSTAL DISPLAY DEVICE

(75) Inventors: Hirofumi Toyama, Kanagawa (JP); Isao Fujiwara, Kanagawa (JP); Jun Takeda, Kanagawa (JP); Yoji Ito, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 132 days.

(21) Appl. No.: 13/272,979

(22) Filed: Oct. 13, 2011

(65) Prior Publication Data

US 2012/0092594 A1    Apr. 19, 2012

(30) Foreign Application Priority Data

Oct. 13, 2010   (JP) .................................. 2010-231033

(51) Int. Cl.
*G02F 1/1335*    (2006.01)
(52) U.S. Cl.
USPC .......................................... 349/118; 349/117
(58) Field of Classification Search
None
See application file for complete search history.

(56) References Cited

U.S. PATENT DOCUMENTS

2005/0219449 A1 * 10/2005 Tanaka .......................... 349/119
2010/0053510 A1    3/2010 Bitou et al.

FOREIGN PATENT DOCUMENTS

| JP | 2002040428 A | 2/2002 |
| JP | 2003186017 A | 7/2003 |
| JP | 2003207782 A | 7/2003 |
| JP | 2004-118185 A | 4/2004 |
| JP | 2007-191505 A | 8/2007 |
| JP | 2008-165185 A | 7/2008 |
| JP | 2010211230 A | 9/2010 |

OTHER PUBLICATIONS

Akira Sakai et al., "Novel Wide View Circular Polarizers Using Negative and Positive AC Plates", SID International Symposium Digest of Technical Papers, Jun. 2009, pp. 402-405, v. 40-i. 1, The Society for Information Display.

* cited by examiner

*Primary Examiner* — Lucy Chien
(74) *Attorney, Agent, or Firm* — Jean C. Edwards, Esq.; Edwards Neils PLLC

(57) ABSTRACT

An optical film contains a cellulose acylate film, and at least two layers of an optically anisotropic layer A and an optically anisotropic layer B, wherein the cellulose acylate film satisfies the specific formulae, Re(548) of the optically anisotropic layer A is from 80 to 190 nm and the slow axis of the optically anisotropic layer A is at 45°±10° with respect to the film conveying direction, and the optically anisotropic layer B satisfies the specific formulae.

14 Claims, No Drawings

OPTICAL FILM AND LIQUID CRYSTAL DISPLAY DEVICE

CROSS-REFERENCE TO RELATED APPLICATIONS

This application claims priority from Japanese Patent Application No. 2010-231033, filed Oct. 13, 2010, the contents of all of which are hereby incorporated by reference in their entirety.

BACKGROUND OF THE INVENTION

1. Field of the Invention

The present invention relates to an optical film and a polarizing plate each contributing to improvement in the contrast ratio, luminance and display unevenness of a liquid crystal display device, and a liquid crystal display device using the same.

2. Description of the Related Art

A liquid crystal display device is being widely used as a display device of various information processing units including a computer and a television. In particular, a TFT-type liquid crystal display device (hereinafter, sometimes referred to as "TFT-LCD") has been widespread, and its market is expected to further expand. This involves the requirement to more enhance the image quality. In the following, the present invention is described by taking TFT-LCD as an example but is not limited to TFT-LCD and is applicable to general liquid crystal display devices, for example, applicable to liquid crystal displays such as passive matrix type and plasma address type.

The mode most widely used so far in the TFT-LCD is a so-called TN mode in which a liquid crystal having positive dielectric anisotropy is horizontally aligned between mutually opposing substrates. On the other hand, there is known a VA-mode liquid crystal display device in which a liquid crystal having negative dielectric anisotropy is vertically aligned between mutually opposing substrates. In the VA-mode liquid crystal display device, liquid crystal molecules are aligned almost vertically to the substrate surfaces when no voltage is applied, and this keeps the liquid crystal cell from showing birefringence and optical rotation and allows light to pass through the liquid crystal cell substantially without causing a change in its polarization state. Accordingly, by sandwiching the liquid crystal cell between a pair of polarizers (linear polarizers) while arranging their absorption axes orthogonal to each other (sometimes referred to as "cross-Nicol polarizers"), a substantially perfect black display can be realized when no voltage is applied. During voltage application, liquid crystal molecules are tilted to be in nearly parallel to the substrates and the liquid cell shows large birefringence to give a white display. Accordingly, the VA-mode liquid crystal display can easily realize a very high contrast ratio.

In such a VA-mode liquid crystal device, when liquid crystal molecules are tilted in one direction during voltage application, the liquid crystal display device shows asymmetric viewing angle characteristics. To avoid this problem, there is widely used, for example, a so-called MVA mode (multi-domain VA mode), which is an alignment division-type VA mode where the tilt direction of liquid crystal molecules is divided into a plurality of directions by devising the pixel electrode structure or providing an alignment control member such as protrusion in a pixel. From the standpoint of maximizing the transmittance in a white display state, the axial azimuth of a polarizer is set to make an angle of 45° with the tilt azimuth of liquid crystal molecules during voltage application. This is because the transmittance when a birefringent medium is sandwiched between cross-Nicole polarizers is proportional to $\sin 2(2\alpha)$ where $\alpha$ (unit: rad) is an angle between the axis of the polarizer and the slow axis of the birefringent medium. In a typical MVA mode, the tilt azimuth of liquid crystal molecules may be divided into four domains of 45°, 135°, 225° and 315°. Also in such an MVA mode with four divided domains, Schlieren alignment or alignment in an unintended direction is often observed at a domain boundary or near the alignment control member, and this gives rise to a transmittance loss.

In order to solve such a problem, a VA mode using a circularly-polarizing plate is being studied (see, for example, JP-A-2002-40428 (the term "JP-A" as used herein means an "unexamined published Japanese patent application"), JP-A-2003-207782, JP-A-2003-186017). According to this liquid crystal display device, the transmittance when a birefringent medium is sandwiched between right and left circularly-polarizing plates orthogonal to each other is independent of an angle made by the axis of the polarizer and the slow axis of the birefringent medium. Therefore, as long as the tilt of liquid crystal molecules can be controlled, a desired transmittance can be secured even if the tilt azimuth of liquid crystal molecules is not 45°, 135°, 225° and 315°. Accordingly, for example, liquid crystal molecules may be tilted at every azimuth by providing a circular protrusion at the center of a pixel, or liquid crystal molecules may be tilted at random azimuths without controlling the tilt azimuth at all. In the description of the present invention, the VA mode using a circularly-polarizing plate is sometimes referred to as a circularly-polarizing VA mode or a circularly-polarizing mode. On the other hand, the VA mode using a linearly-polarizing plate is sometimes referred to as a linearly-polarizing VA mode or a linearly-polarizing mode. Also, as is well known, the circularly-polarizing plate is typically composed of a combination of a linearly-polarizing plate and a λ/4 plate.

As for a normal circularly-polarizing VA-mode liquid crystal display device. there is room for improvement in the point that the contrast ratio at an oblique viewing angle is low and sufficient viewing angle characteristics cannot be obtained. In this respect, various techniques for improving the viewing angle characteristics by using a retardation film have been proposed (JP-A-2010-211230, Akira Sakai, et al., *Novel Wide-View Circular Polarizers Using Negative and Positive AC Plates*, SID 09 DIGEST, pp. 402-405 (2009)).

However, the methods described in JP-A-2010-211230, Akira Sakai, et al., *Novel Wide-View Circular Polarizers Using Negative and Positive AC Plates*, SID 09 DIGEST, pp. 402-405 (2009) require many lamination steps for producing an optical film so as to realize a wide viewing angle and high luminance, and this leads to a cumbersome production process and a high cost. Furthermore, there is a problem that the thickness difference between the optical film used on the viewing side and the optical film used on the backlight side is large and when the liquid crystal display device is continuously lighted, unevenness is readily generated.

SUMMARY OF THE INVENTION

A liquid crystal display device having a wide viewing angle and excellent outdoor visibility has been proposed in JP-A-2010-211230, Akira Sakai, et al., *Novel Wide-View Circular Polarizers Using Negative and Positive AC Plates*, SID 09 DIGEST, pp. 402-405 (2009). However, heretofore, a step of laminating an optical anisotropic layer must be performed at least two times. Accordingly, the production process is cumbersome and the cost is high. Furthermore, the thickness difference between the optical film used on the viewing side and the optical film used on the backlight side is large and when the liquid crystal display device is continuously lighted, unevenness is readily generated.

Under these circumstances, an object of the present invention is to provide a liquid crystal display device ensuring that the step of laminating films together is performed once or less, a wide viewing angle and excellent outdoor visibility are realized, and unevenness on continuous lighting is reduced.

The foregoing object of the invention can be achieved by the following means.

[1] An optical film comprising:
  a cellulose acylate film; and
  at least two layers of an optically anisotropic layer A and an optically anisotropic layer B,
  wherein
  the cellulose acylate film satisfies the following formulae (I) and (II),
  Re(548) of the optically anisotropic layer A is from 80 to 190 nm and the slow axis of the optically anisotropic layer A is at 45°±10° with respect to the film conveying direction, and
  the optically anisotropic layer B satisfies the following formulae (III) and (IV):

$$0.1 \leq DSA \leq 2.0 \quad \text{Formula (I):}$$

$$1.0 \leq DSB \leq 2.9 \quad \text{Formula (II):}$$

(wherein DSA represents the acetyl substitution degree, and DSB represents the benzoyl substitution degree);

$$-10 \text{ nm} \leq Re(548) \leq 10 \text{ nm} \quad \text{Formula (III):}$$

$$Nz \geq 10 \quad \text{Formula (IV):}$$

(wherein Re($\lambda$) represents the in-plane retardation at a wavelength of $\lambda$, and Nz=(nx−nz)/(nx−ny), wherein nx, ny and nz represent the refractive indexes in the film conveying direction, the direction perpendicular to the film conveying direction, and the thickness direction, respectively).

[2] The optical film as described in [1] above, wherein the cellulose acylate film satisfies the following formula (V):

$$0.35 \leq DSA \leq 1.5 \quad \text{Formula (V):}$$

[3] The optical film as described in [1] or [2] above, wherein the optically anisotropic layer A contains a rod-like liquid crystal compound.

[4] The optical film as described in any one of [1] to [3] above, wherein the optically anisotropic layer B contains a discotic liquid crystal compound.

[5] The optical film as described in any one of [1] to [4] above, wherein the cellulose acylate film, the optically anisotropic layer A and the optically anisotropic layer B are disposed in order in the optical film.

[6] A liquid crystal display device comprising the following members in order:
  a polarizer;
  the optical film described in any one of [1] to [5] above;
  a VA-mode liquid crystal cell;
  a second optical film; and
  a polarizer,
  wherein the low axis of the second optical film is at 45°±10° with respect to the film conveying direction and Re(548) is from 80 to 190 nm.

[7] The liquid crystal display device as claimed in claim 6, which is a VA-mode liquid crystal display device fabricated by disposing a polarizing plate laminated with the optical film described in any one of [1] to [5] above on the viewing side of the liquid crystal display device.

[8] An optical film comprising:
  an optical film C wherein a cellulose acylate film and an optically anisotropic layer c are stacked; and
  at least two layers of an optically anisotropic layer A and an optically anisotropic layer B,
  wherein
  Re(548) of the optical film C satisfies the range of 50 to 400 nm,
  Re(548) of the optically anisotropic layer A is from 80 to 190 nm and the slow axis of the optically anisotropic layer A is at 45°±10° with respect to the film conveying direction, and
  the optically anisotropic layer B satisfies the following formulae (III) and (IV):

$$-10 \text{ nm} \leq Re(548) \leq 10 \text{ nm} \quad \text{Formula (III):}$$

$$Nz \geq 10 \quad \text{Formula (IV):}$$

(wherein Re($\lambda$) represents the in-plane retardation at a wavelength of $\lambda$, and Nz=(nx−nz)/(nx−ny), wherein nx, ny and nz represent the refractive indexes in the film conveying direction, the direction perpendicular to the film conveying direction, and the thickness direction, respectively).

[9] The optical film as described in [8] above, wherein the optically anisotropic layer c of the optical film C contains a discotic liquid crystal compound and the slow axis of the optical film C is at 0°±10° or 90°±10° with respect to the film conveying direction.

[10] The optical film as described in [8] or [9] above, wherein the optically anisotropic layer A contains a rod-like liquid crystal compound.

[11] The optical film as described in any one of [8] to [10] above, wherein the optically anisotropic layer B contains a discotic liquid crystal compound.

[12] The optical film as described in any one of [8] to [11] above, wherein the cellulose acylate film, the optically anisotropic layer c, the optically anisotropic layer A and the optically anisotropic layer B are disposed in order.

[13] A liquid crystal display device comprising the following members in order:
  a polarizer;
  the optical film described in any one of [8] to [12] above;
  a VA-mode liquid crystal cell;
  a second optical film; and
  a polarizer,
  wherein the low axis of the second optical film is at 45°±10° with respect to the film conveying direction and Re(548) is from 80 to 190 nm.

[14] The liquid crystal display device as described in [13] above, which is a VA-mode liquid crystal display device fabricated by disposing a polarizing plate laminated with the optical film described in any one of [8] to [12] above on the viewing side of the liquid crystal display device.

According to the present invention, an optical film suitably used for a liquid crystal display device, ensuring that the step of laminating films together is performed once or less and a wide viewing angle and excellent outdoor visibility are realized, can be provided.

Also, according to the present invention, a liquid crystal display device where the thickness difference between the optical film used on the viewing side and the optical film used on the backlight side is small and unevenness is less likely to be generated on continuous lighting, can be provided.

DETAILED DESCRIPTION OF THE INVENTION

[Cellulose Acylate Film]

The cellulose acylate film of the present invention is applied in two configurations, that is, a film configuration when applied as a single-layer biaxial film by specifying the acetyl substitution degree and the benzoyl substitution degree, and a configuration when used as a support in the case of coating an optically anisotropic layer right above the film to make a biaxial optical characteristic film.

The cellulose acylate film of the present invention is composed of a composition containing at least one kind of a cellulose acylate having at least an aromatic group-containing acyl group (substituent A). The cellulose has a free hydroxyl group at the 2-position, 3-position and 6-position per β-1,4-bonded glucose unit. Assuming that the substitution degree of the substituent A in the cellulose acylate is DSA and the substitution degree of an aliphatic acyl group (substituent B) is DSB, the cellulose acylate film satisfies formula (I): $0.1 \leq DSA \leq 2.0$, and formula (II): $1.0 \leq DSB \leq 2.9$. DSA is preferably from 0.35 to 1.5, more preferably from 0.5 to 1.35.

(Aromatic Group-Containing Acyl Group (Substituent A))

In the present invention, the aromatic group-containing acyl group (substituent A) may be bonded to an ester bond part directly or through a linking group and is preferably directly bonded. The linking group as used herein indicates an alkylene group, an alkenylene group or an alkynylene group, and the linking group may have a substituent. The linking group is preferably an alkylene, alkenylene or alkynylene group having a carbon number of 1 to 10, more preferably an alkylene or alkenylene group having a carbon number of 1 to 6, and most preferably an alkylene or alkenylene group having a carbon number of 1 to 4.

The aromatic may have a substituent, and examples of the substituent substituted on the aromatic and the substituent substituted on the linking group include an alkyl group (preferably having a carbon number of 1 to 20, more preferably from 1 to 12, still more preferably from 1 to 8, e.g., methyl group, ethyl group, propyl group, isopropyl group, tert-butyl group, n-butyl group, n-octyl group, n-decyl group, n-hexadecyl group, cyclopropyl group, cyclopentyl group, cyclohexyl group), an alkenyl group (preferably having a carbon number of 2 to 20, more preferably from 2 to 12, still more preferably from 2 to 8, e.g., vinyl group, allyl group, 2-butenyl group, 3-pentenyl group), an alkynyl group (preferably having a carbon number of 2 to 20, more preferably from 2 to 12, still more preferably from 2 to 8, e.g., propargyl group, 3-pentynyl group), an aryl group (preferably having a carbon number of 6 to 30, more preferably from 6 to 20, still more preferably from 6 to 12, e.g., phenyl group, biphenyl group, naphthyl group), an amino group (preferably having a carbon number of 0 to 20, more preferably from 0 to 10, still more preferably from 0 to 6, e.g., amino group, methylamino group, dimethylamino group, diethylamino group, dibenzylamino group), an alkoxy group (preferably having a carbon number of 1 to 20, more preferably from 1 to 12, still more preferably from 1 to 8, e.g., methoxy group, ethoxy group, butoxy group), an aryloxy group (preferably having a carbon number of 6 to 20, more preferably from 6 to 16, still more preferably from 6 to 12, e.g., phenyloxy group, 2-naphthyloxy group), an acyl group (preferably having a carbon number of 1 to 20, more preferably from 1 to 16, still more preferably from 1 to 12, e.g., acetyl group, benzoyl group, formyl group, pivaloyl group), an alkoxycarbonyl group (preferably having a carbon number of 2 to 20, more preferably from 2 to 16, still more preferably from 2 to 12, e.g., methoxycarbonyl group, ethoxycarbonyl group), an aryloxycarbonyl group (preferably having a carbon number of 7 to 20, more preferably from 7 to 16, still more preferably from 7 to 10, e.g., phenyloxycarbonyl group), an acyloxy group (preferably having a carbon number of 2 to 20, more preferably from 2 to 16, still more preferably from 2 to 10, e.g., acetoxy group, benzoyloxy group), an acylamino group (preferably having a carbon number of 2 to 20, more preferably from 2 to 16, still more preferably from 2 to 10, e.g., acetylamino group, benzoylamino group), an alkoxycarbonylamino group (preferably having a carbon number of 2 to 20, more preferably from 2 to 16, still more preferably from 2 to 12, e.g., methoxycarbonylamino group), an aryloxycarbonylamino group (preferably having a carbon number of 7 to 20, more preferably from 7 to 16, still more preferably from 7 to 12, e.g., phenyloxycarbonylamino group), a sulfonylamino group (preferably having a carbon number of 1 to 20, more preferably from 1 to 16, still more preferably from 1 to 12, e.g., methanesulfonylamino group, benzenesulfonylamino group), a sulfamoyl group (preferably having a carbon number of 0 to 20, more preferably from 0 to 16, still more preferably from 0 to 12, e.g., sulfamoyl group, methylsulfamoyl group, dimethylsulfamoyl group, phenylsulfamoyl group), a carbamoyl group (preferably having a carbon number of 1 to 20, more preferably from 1 to 16, still more preferably from 1 to 12, e.g., carbamoyl group, methylcarbamoyl group, diethylcarbamoyl group, phenylcarbamoyl group), an alkylthio group (preferably having a carbon number of 1 to 20, more preferably from 1 to 16, still more preferably from 1 to 12, e.g., methylthio group, ethylthio group), an arylthio group (preferably having a carbon number of 6 to 20, more preferably from 6 to 16, still more preferably from 6 to 12, e.g., phenylthio group), a sulfonyl group (preferably having a carbon number of 1 to 20, more preferably from 1 to 16, still more preferably from 1 to 12, e.g., mesyl group, tosyl group), a sulfinyl group (preferably having a carbon number of 1 to 20, more preferably from 1 to 16, still more preferably from 1 to 12, e.g., methanesulfinyl group, benzenesulfinyl group), a ureido group (preferably having a carbon number of 1 to 20, more preferably from 1 to 16, still more preferably from 1 to 12, e.g., ureido group, methylureido group, phenylureido group), a phosphoric acid amide group (preferably having a carbon number of 1 to 20, more preferably from 1 to 16, still more preferably from 1 to 12, e.g., diethylphosphoric acid amide, phenylphosphoric acid amide), a hydroxy group, a mercapto group, a halogen atom (e.g., fluorine atom, chlorine atom, bromine atom, iodine atom), a cyano group, a sulfo group, a carboxyl group, a nitro group, a hydroxamic acid group, a sulfino group, a hydrazino group, an imino group, a heterocyclic group (preferably having a carbon number of 1 to 30, more preferably from 1 to 12; examples of the heteroatom include a nitrogen atom, an oxygen atom and a sulfur atom; specifically, e.g., imidazolyl group, pyridyl group, quinolyl group, furyl group, piperidyl group, morpholino group, benzoxazolyl group, benzimidazolyl group, benzothiazolyl group), and a silyl group (preferably having a carbon number of 3 to 40, more preferably from 3 to 30, still more preferably from 3 to 24, e.g., trimethylsilyl group, triphenylsilyl group). A substituent may be further substituted on these substituents, and when two or more substituents are present, each substituent may be the same as or different from every other substituents. Also, if possible, the substituents may combine with each other to form a ring.

The aromatic is defined as an aromatic compound in Rikagaku Jiten (*Physicochemical Dictionary*), 4th ed., page 1208, Iwanami Shoten, and the aromatic group for use in the present invention may be an aromatic hydrocarbon group or an aromatic heterocyclic group and is preferably an aromatic hydrocarbon group. The aromatic hydrocarbon group is preferably an aromatic hydrocarbon group having a carbon number of 6 to 24, more preferably from 6 to 12, still more preferably from 6 to 10. Specific examples of the aromatic hydrocarbon group include a phenyl group, a naphthyl group, an anthryl group, a biphenyl group and a terphenyl group, with a phenyl group being preferred. The aromatic hydrocarbon group is more preferably a phenyl group, a naphthyl group or a biphenyl group. The aromatic heterocyclic group is preferably an aromatic heterocyclic group containing at least one of an oxygen atom, a nitrogen atom and a sulfur atom. Specific examples of the heterocyclic ring thereof include furan, pyrrole, thiophene, imidazole, pyrazole, pyridine, pyrazine, pyridazine, triazole, triazine, indole, indazole, purine, thiazoline, thiadiazole, oxazoline, oxazole, oxadiazole, quinoline, isoquinoline, phthalazine, naphthylidine, quinoxaline, quinazoline, cinnoline, pteridine, acridine, phenanthroline, phenazine, tetrazole, benzimidazole, benzoxazole, benzothiazole, benzotriazole and tetrazaindene. The aromatic heterocyclic group is preferably a pyridyl group, a triazinyl group or a quinolyl group.

Preferred examples of the aromatic group-containing acyl group (substituent A) include a phenylacetyl group, a hydrocinnamoyl group, a diphenylacetyl group, a phenoxyacetyl group, a benzyloxyacetyl group, an O-acetylmandelyl group, a 3-methoxyphenylacetyl group, a 4-methoxyphenylacetyl group, a 2,5-dimethoxyphenylacetyl group, a 3,4-dimethoxyphenylacetyl group, a 9-fluorenylmethylacetyl group, a cinnamoyl group, a 4-methoxy-cinnamoyl group, a benzoyl group, an ortho-toluoyl group, a meta-toluoyl group, a para-toluoyl group, an m-anisoyl group, a p-anisoyl group, a phenylbenzoyl group, a 4-ethylbenzoyl group, a 4-propylbenzoyl group, a 4-tert-butylbenzoyl group, a 4-butylbenzoyl group, a 4-pentylbenzoyl group, a 4-hexylbenzoyl group, a 4-heptylbenzoyl group, a 4-octylbenzoyl group, a 4-vinylbenzoyl group, a 4-ethoxybenzoyl group, a 4-butoxybenzoyl group, a 4-hexyloxybenzoyl group, a 4-heptyloxybenzoyl group, a 4-pentyloxybenzoyl group, a 4-octyloxybenzoyl group, a 4-nonyloxybenzoyl group, a 4-decyloxybenzoyl group, a 4-undecyloxybenzoyl group, a 4-dodecyloxybenzoyl group, a 4-isopropioxybenzoyl group, a 2,3-dimethoxybenzoyl group, a 2,5-dimethoxybenzoyl group, a 3,4-dimethoxybenzoyl group, a 2,6-dimethoxybenzoyl group, a 2,4-dimethoxybenzoyl group, a 3,5-dimethoxybenzoyl group, a 3,4,5-trimethoxybenzoyl group, a 2,4,5-trimethoxybenzoyl group, a 1-naphthoyl group, a 2-naphthoyl group, a 2-biphenylcarbonyl group, a 4-biphenylcarbonyl group, a 4'-ethyl-4-biphenylcarbonyl group, a 4'-octyloxy-4-biphenylcarbonyl group, a piperonyloyl group, a diphenylacetyl group, a triphenylacetyl group, a phenylpropionyl group, a hydrocinnamoyl group, an α-methylhydrocinnamoyl group, a 2,2-diphenylpropionyl group, a 3,3-diphenylpropionyl group, a 3,3,3-triphenylpropionyl group, a 2-phenylbutyryl group, a 3-phenylbutyryl group, a 4-phenylbutyryl group, a 5-phenylvaleryl group, a 3-methyl-2-phenylvaleryl group, a 6-phenylhexanoyl group, an α-methoxyphenylacetyl group, a phenoxyacetyl group, a 3-phenoxypropionyl group, a 2-phenoxypropionyl group, a 11-phenoxydecanoyl group, a 2-phenoxybutyryl group, a 2-methoxyacetyl group, a 3-(2-methoxyphenyl)propionyl group, a 3-(p-toluoyl)propionyl group, a (4-methylphenoxy)acetyl group, a 4-isobutyl-α-methylphenylacetyl group, a 4-(4-methoxyphenyl)butyryl group, (2,4-di-tert-pentylphenoxy)-acetyl group, a 4-(2,4-di-tert-pentylphenoxy)-butyryl group, a (3,4-dimethoxyphenyl)acetyl group, a 3,4-(methylenedioxy)phenylacetyl group, a 3-(3,4-dimethoxyphenyl)propionyl group, a 4-(3,4-dimethoxyphenyl)butyryl group, (2,5-dimethoxyphenyl)acetyl group, a (3,5-dimethoxyphenyl)acetyl group, a 3,4,5-trimethoxyphenylacetyl group, a 3-(3,4,5-trimethoxyphenyl)-propionyl group, an acetyl group, a 1-naphthylacetyl group, a 2-naphthylacetyl group, an α-trityl-2-naphthalene-propionyl group, a (1-naphthoxy)acetyl group, a (2-naphthoxy)acetyl group, a 6-methoxy-α-methyl-2-naphthaleneacetyl group, a 9-fluoreneacetyl group, a 1-pyreneacetyl group, a 1-pyrenebutyryl group, a γ-oxopyrenebutyryl group, a styreneacetyl group, an α-methylcinnamoyl group, an α-phenylcinnamoyl group, a 2-methylcinnamoyl group, a 2-methoxycinnamoyl group, a 3-methoxycinnamoyl group, a 2,3-dimethoxycinnamoyl group, a 2,4-dimethoxycinnamoyl group, a 2,5-dimethoxycinnamoyl group, a 3,4-dimethoxycinnamoyl group, a 3,5-dimethoxycinnamoyl group, a 3,4-(methylenedioxy)cinnamoyl group, a 3,4,5-trimethoxycinnamoyl group, a 2,4,5-trimethoxycinnamoyl group, a 3-methylidene-2-carbonyl group, a 4-(2-cyclohexyloxy)benzoyl group, a 2,3-dimethylbenzoyl group, a 2,6-dimethylbenzoyl group, a 2,4-dimethylbenzoyl group, a 2,5-dimethylbenzoyl group, a 3-methoxy-4-methylbenzoyl group, a 3,4-diethoxybenzoyl group, an α-phenyl-O-toluoyl group, a 2-phenoxybenzoyl group, a 2-benzoylbenzoyl group, a 3-benzoylbenzoyl group, a 4-benzoylbenzoyl group, a 2-ethoxy-1-naphthoyl group, a 9-fluorenecarbonyl group, a 1-fluorenecarbonyl group, a 4-fluorenecarbonyl group, a 9-anthracenecarbonyl group, and a 1-pyrenecarbonyl group.

The substituent A is more preferably a phenylacetyl group, a hydrocinnamoyl group, a diphenylacetyl group, a phenoxyacetyl group, a benzyloxyacetyl group, an O-acetylmandelyl group, a 3-methoxyphenylacetyl group, a 4-methoxyphenylacetyl group, a 2,5-dimethoxyphenylacetyl group, a 3,4-dimethoxyphenylacetyl group, a 9-fluorenylmethylacetyl group, a cinnamoyl group, a 4-methoxy-cinnamoyl group, a benzoyl group, an ortho-toluoyl group, a meta-toluoyl group, a para-toluoyl group, an m-anisoyl group, a p-anisoyl group, a phenylbenzoyl group, a 4-ethylbenzoyl group, a 4-propylbenzoyl group, a 4-tert-butylbenzoyl group, a 4-butylbenzoyl group, a 4-pentylbenzoyl group, a 4-hexylbenzoyl group, a 4-heptylbenzoyl group, a 4-octylbenzoyl group, a 4-vinylbenzoyl group, a 4-ethoxybenzoyl group, a 4-butoxybenzoyl group, a 4-hexyloxybenzoyl group, a 4-heptyloxybenzoyl group, a 4-pentyloxybenzoyl group, a 4-octyloxybenzoyl group, a 4-nonyloxybenzoyl group, a 4-decyloxybenzoyl group, a 4-undecyloxybenzoyl group, a 4-dodecyloxybenzoyl group, a 4-isopropioxybenzoyl group, a 2,3-dimethoxybenzoyl group, a 2,5-dimethoxybenzoyl group, a 3,4-dimethoxybenzoyl group, a 2,6-dimethoxybenzoyl group, a 2,4-dimethoxybenzoyl group, a 3,5-dimethoxybenzoyl group, a 2,4,5-trimethoxybenzoyl group, a 3,4,5-trimethoxybenzoyl group, a 1-naphthoyl group, a 2-naphthoyl group, a 2-biphenylcarbonyl group, a 4-biphenylcarbonyl group, a 4'-ethyl-4-biphenylcarbonyl group, or a 4'-octyloxy-4-biphenylcarbonyl group.

The substituent A is still more preferably a phenylacetyl group, a diphenylacetyl group, a phenoxyacetyl group, a cinnamoyl group, a 4-methoxy-cinnamoyl group, a benzoyl group, a phenylbenzoyl group, a 4-ethylbenzoyl group, a 4-propylbenzoyl group, a 4-tert-butylbenzoyl group, a 4-butylbenzoyl group, a 4-pentylbenzoyl group, a 4-hexylbenzoyl group, a 4-heptylbenzoyl group, a 3,4-dimethoxybenzoyl group, a 2,6-dimethoxybenzoyl group, a 2,4-dimethoxybenzoyl group, a 3,5-dimethoxybenzoyl group, a 3,4,5-trimethoxybenzoyl group, a 2,4,5-trimethoxybenzoyl group, a 1-naphthoyl group, a 2-naphthoyl group, a 2-biphenylcarbonyl group, or a 4-biphenylcarbonyl group.

The substituent A is yet still more preferably a benzoyl group, a phenylbenzoyl group, a 4-heptylbenzoyl group, a 2,4,5-trimethoxybenzoyl group, or a 3,4,5-trimethoxybenzoyl group. The substituent A substituted on the cellulose acylate may be one kind of a substituent or two or more kinds of substituents.

The cellulose acylate above contains an acyl group other than the aromatic group-containing acyl group (substituent A), specifically, contains an aliphatic acyl group (substituent B).

(Aliphatic Acyl Group (Substituent B))

The aliphatic acyl group (substituent B) for use in the present invention may be an aliphatic acyl group having any of linear, branched and cyclic structures or may be an aliphatic acyl group containing an unsaturated bond. The aliphatic acyl group is preferably an aliphatic acyl group having a carbon number of 2 to 20, more preferably a carbon number of 2 to 10, still more preferably a carbon number of 2 to 4. Preferred examples of the substituent B include an acetyl group, a propionyl group, and a butyryl group, with a butyryl group being more preferred. When the substituent B is an acetyl group, a film having appropriate glass transition temperature (Tg), modulus and the like can be obtained. By having an aliphatic acyl group with a small carbon number, such as acetyl group, adequate strength as a film can be obtained without causing reduction in the Tg, modulus and the like. The substitution degree DSB of the substituent B is preferably from 1.15 to 2.85, more preferably from 1.3 to 2.7.

Specific examples of the cellulose acylate having an aromatic group-containing acyl group (substituent A) and an aliphatic acyl group (substituent B) are set forth below, but the present invention is not limited to these examples.

TABLE 1

| No. | Substituent A | Substitution Degree of Substituent A (DSA) | Substituent B | Substitution Degree of Substituent B (DSB) |
|---|---|---|---|---|
| A-1 | benzoyl group | 0.55 | acetyl group | 2.15 |
| A-2 | benzoyl group | 0.60 | acetyl group | 2.25 |
| A-3 | benzoyl group | 0.65 | acetyl group | 2.15 |
| A-4 | heptylbenzoyl group | 0.55 | acetyl group | 2.15 |
| A-5 | heptylbenzoyl group | 0.60 | acetyl group | 2.15 |
| A-6 | heptylbenzoyl group | 0.65 | acetyl group | 2.15 |
| A-7 | heptoxybenzoyl group | 0.55 | acetyl group | 2.15 |
| A-8 | heptoxybenzoyl group | 0.60 | acetyl group | 2.15 |
| A-9 | heptoxybenzoyl group | 0.65 | acetyl group | 2.15 |
| A-10 | butylbenzoyl group | 0.55 | acetyl group | 2.15 |
| A-11 | butylbenzoyl group | 0.60 | acetyl group | 2.15 |
| A-12 | butylbenzoyl group | 0.65 | acetyl group | 2.15 |
| A-13 | butoxybenzoyl group | 0.55 | acetyl group | 2.15 |
| A-14 | butoxybenzoyl group | 0.60 | acetyl group | 2.15 |
| A-15 | butoxybenzoyl group | 0.65 | acetyl group | 2.15 |
| A-16 | octylbenzoyl group | 0.55 | acetyl group | 2.15 |
| A-17 | octylbenzoyl group | 0.60 | acetyl group | 2.15 |
| A-18 | octylbenzoyl group | 0.65 | acetyl group | 2.15 |
| A-19 | octyloxybenzoyl group | 0.55 | acetyl group | 2.15 |
| A-20 | octyloxybenzoyl group | 0.60 | acetyl group | 2.15 |

TABLE 2

| No. | Substituent A | Substitution Degree of Substituent A (DSA) | Substituent B | Substitution Degree of Substituent B (DSB) |
|---|---|---|---|---|
| A-21 | octyloxybenzoyl group | 0.65 | acetyl group | 2.15 |
| A-22 | nonyloxybenzoyl group | 0.55 | acetyl group | 2.15 |
| A-23 | nonyloxybenzoyl group | 0.60 | acetyl group | 2.15 |
| A-24 | nonyloxybenzoyl group | 0.65 | acetyl group | 2.15 |
| A-25 | decyloxybenzoyl group | 0.55 | acetyl group | 2.15 |
| A-26 | decyloxybenzoyl group | 0.60 | acetyl group | 2.15 |
| A-27 | decyloxybenzoyl group | 0.65 | acetyl group | 2.15 |
| A-28 | undecyloxybenzoyl group | 0.55 | acetyl group | 2.15 |
| A-29 | undecyloxybenzoyl group | 0.60 | acetyl group | 2.15 |
| A-30 | undecyloxybenzoyl group | 0.65 | acetyl group | 2.15 |
| A-31 | dodecyloxybenzoyl group | 0.55 | acetyl group | 2.15 |
| A-32 | dodecyloxybenzoyl group | 0.60 | acetyl group | 2.15 |
| A-33 | dodecyloxybenzoyl group | 0.65 | acetyl group | 2.15 |
| A-34 | 4-phenylbenzoyl group | 0.65 | acetyl group | 2.20 |
| A-35 | 4-phenylbenzoyl group | 0.75 | acetyl group | 2.15 |
| A-36 | 4-phenylbenzoyl group | 0.80 | acetyl group | 2.15 |
| A-37 | benzoyl group | 0.75 | acetyl group | 1.76 |
| A-38 | benzoyl group | 0.80 | acetyl group | 1.76 |
| A-39 | benzoyl group | 0.85 | acetyl group | 1.76 |
| A-40 | benzoyl group | 0.90 | acetyl group | 1.76 |
| A-41 | benzoyl group | 0.95 | acetyl group | 1.76 |
| A-42 | benzoyl group | 1.00 | acetyl group | 1.76 |
| A-43 | benzoyl group | 1.05 | acetyl group | 1.76 |

The cellulose acylate is a compound having a cellulose skeleton obtained by using a cellulose as a raw material and biologically or chemically introducing at least an aromatic group-containing acyl group (substituent A). As for the raw material cotton of the cellulose acylate, a cellulose having a low polymerization degree (polymerization degree: from 100 to 300) obtained by acid-hydrolyzing wood pulp, such as fine crystal cellulose, as well as natural cellulose such as cotton linter and wood pulp (e.g., hardwood pulp, softwood pulp) can be used and depending on the case, a mixture thereof may be used. These raw material celluloses are described in detail, for example, in Marusawa and Uda, *Plastic Zairyo Koza* (17), *Seniso-kei Jushi* (*Lecture on Plastic Material* (17), *Cellulose-Based Resin*), Nikkan Kogyo Shinbun Sha (1970), *JIII Journal of Technical Disclosure*, No. 2001-1745, pp. 7-8, and *Cellulose no Jiten* (*Encyclopedia of Cellulose*), page 523, compiled by The Cellulose Society of Japan, Asakura-Shoten (2000), and celluloses described therein can be used. The cellulose is not particularly limited.

The cellulose acylate for use in the present invention can be obtained using a cellulose acetate produced by Aldrich (acetyl substitution degree: 2.45) or a cellulose acetate produced by Daicel Chemical Industries, Ltd. (acetyl substitution degree: 2.41 (trade name: L-70), 2.19 (trade name: FL-70), 1.76 (trade name) LL-10)) as a starting material and reacting it with a corresponding acid chloride. Usually, when a cellulose acetate in which a part of hydroxy groups are substituted with an acetyl group is used as a starting material and reacted with an acid chloride such as benzoyl chloride to introduce the substituent A, the substituent is introduced preferentially into the 6-position. In order to obtain a cellulose acylate in which the substituent A is substituted preferentially on the 2-position and the 3-position, the cellulose acetate is once subjected to a deacetylation treatment to preferentially desorb the acetyl group at the 2-position and the 3-position and thereafter acylated with an acid chloride, whereby a cellulose acylate in which the substituent A is introduced preferentially into the 2-position and the 3-position and an acetyl group as the substituent B is present mainly at the 6-position, is obtained. The deacetylation may be allowed to proceed, for example, in the presence of an amine and water. A cellulose acylate satisfying formulae (I) and (II) can be produced by adjusting the acetyl substitution degree of the cellulose acetate as a starting material, the conditions of deacetylation treatment, and the introduction conditions of the substituent A.

The viscosity average polymerization degree of the cellulose acylate is not particularly limited but is preferably from 80 to 700, more preferably from 90 to 500, still more preferably from 100 to 500. When the average polymerization degree is 500 or less, the viscosity of the cellulose acylate dope solution can be kept from becoming excessively high and film production by casting tends to be facilitated. Also, when the polymerization degree is 140 or more, the strength of the produced film is liable to be more increased and this is preferred. The average polymerization degree can be measured by the intrinsic viscosity method of Uda, et al. (Kazuo Uda and Hideo Saito, *JOURNAL OF THE SOCIETY OF FIBER SCIENCE AND TECHNOLOGY*, JAPAN, Vol. 18, No. 1, pp. 105-120 (1962)). Specifically, the average polymerization degree can be measured according to the method described in JP-A-9-95538.

[Cellulose Acylate Composition]

The cellulose acylate composition usable in the present invention is described below.

The cellulose acylate composition used for the production of the cellulose acylate film of the present invention contains at least one kind of the above-described cellulose acylate. The cellulose acylate composition preferably contains the cellulose acylate in an amount of 70 to 100 mass %, more preferably from 80 to 100 mass %, still more preferably from 90 to 100 mass %, based on the entire composition.

The cellulose acylate composition can take various shapes such as particle, powder, fiber, lump, solution and melt. The raw material for the film production is preferably in a particle or powder shape and therefore, the cellulose acylate composition after drying may be pulverized or sieved to uniformize the particle size or improve the handleability.

In the present invention, only one kind of a cellulose acylate may be used, or two or more kinds of cellulose acylates may be mixed and used. Also, a polymer component other than a cellulose acylate, or various additives may be appropriately mixed. The component mixed preferably has excellent compatibility with the cellulose acylate and is preferably added such that the film formed has a transmittance of 80% or more, more preferably 90% or more, still more preferably 92% or more.

In the present invention, various additives (for example, an ultraviolet inhibitor, a plasticizer, a deterioration inhibitor, a fine particle and an optical property adjusting agent) which can be generally added to a cellulose acylate may be added to the cellulose acylate to make a composition. As for the timing of adding the additives to the cellulose acylate, the additives may be added at any time in the dope production process or may be added as a preparation step at the end of the dope production process.

[Cellulose Acylate Film]

The present invention relates to a cellulose acylate film formed of a composition containing at least one kind of the above-described acylate. In the cellulose acylate film of the present invention, the cellulose acylate is preferably contained in an amount of 50 mass % or more, more preferably 80% or more, still more preferably 95% or more.

The production method of the cellulose acylate film of the present invention is not particularly limited, but the cellulose acylate film is preferably produced by the melt film-forming method or solution film-forming method described below, more preferably the solution film-forming method. In both the melt film-forming method and the solution film-forming method, the cellulose acylate film of the present invention can be produced in the same manner as in the method performed in general. For example, the cellulose acylate film can be produced by referring to JP-A-2006-348123 as to the melt film-forming method and JP-A-2006-241433 as to the solution film-forming method.

<Solution Film Formation>

A preferred embodiment in producing the cellulose acylate film of the present invention by the solution film-forming method is described below. In the solution film-forming method, a cellulose acylate solution is prepared and the solution is cast on a support surface and film-formed. The solvent for use in the preparation of the cellulose acylate solution is not particularly limited. The preferred solvent includes a chlorine-based organic solvent such as dichloromethane, chloroform, 1,2-dichloroethane and tetrachloroethylene, and a chlorine-free organic solvent. The chlorine-free organic solvent is preferably a solvent selected from an ester, a ketone and an ether each having a carbon number of 3 to 12. The ester, ketone and ether may have a cyclic structure. A compound having two or more functional groups of an ester, a ketone and an ether (that is, —O—, —CO— and —COO—) may be also used as the main solvent, and the compound may have another functional group such as alcoholic hydroxyl group. In the case of a main solvent having two or more kinds of functional groups, the number of carbon atoms may suffice if it falls within the range specified for a compound having any one functional group. Examples of the esters having a carbon number of 3 to 12 include ethyl formate, propyl formate, pentyl formate, methyl acetate, ethyl acetate and pentyl acetate. Examples of the ketones having a carbon number of 3 to 12 include acetone, methyl ethyl ketone, diethyl ketone, diisobutyl ketone, cyclopentanone, cyclohexanone and methylcyclohexanone. Examples of the ethers having a carbon number of 3 to 12 include diisopropyl ether, dimethoxymethane, dimethoxyethane, 1,4-dioxane, 1,3-dioxolane, tetrahydrofuran, anisole and phenetole. Examples of the organic solvent having two or more kinds of functional groups include 2-ethoxyethyl acetate, 2-methoxyethanol and 2-butoxyethanol.

At the preparation of the cellulose acylate solution, the cellulose acylate is preferably dissolved in an organic solvent to a concentration of 10 to 35 mass %, more preferably from 13 to 30 mass %, still more preferably from 15 to 28 mass %. The cellulose acylate solution having such a concentration may be prepared to have a predetermined concentration at the stage of dissolving the cellulose acylate in the solvent or may be prepared as a solution having a predetermined concentration through a concentration step after previously preparing a low concentration (for example, from 9 to 14 mass %) solution. Also, after previously preparing a high-concentration cellulose acylate solution, the cellulose acylate solution having the above-described concentration may be prepared by adding various additives.

As for the preparation of the cellulose acylate solution (dope), the dissolution thereof is not particularly limited in its method and may be performed at room temperature or by a cooling dissolution method, a high-temperature dissolution method or a combination thereof. With respect to these methods, the preparation method of a cellulose acylate solution is described, for example, in JP-A-5-163301, JP-A-61-106628, JP-A-58-127737, JP-A-9-95544, JP-A-10-95854, JP-A-10-45950, JP-A-2000-53784, JP-A-11-322946, JP-A-11-322947, JP-A-2-276830, JP-A-2000-273239, JP-A-11-71463, JP-A-04-259511, JP-A-2000-273184, JP-A-11-323017 and JP-A-11-302388, and these techniques can be utilized also in the present invention. For details, particularly, the preparation method using a solvent based on a chlorine-free solvent is described in detail in *JIII Journal of Technical Disclosure*, No. 2001-1745, pp. 22-25, Japan Institute of Invention and Innovation (Mar. 15, 2001). Furthermore, a treatment such as concentration and filtration of the solution may be performed in the course of preparing the cellulose acylate solution, and these are similarly described in detail in *JIII Journal of Technical Disclosure*, No. 2001-1745, page 25, Japan Institute of Invention and Innovation (Mar. 15, 2001). In the case of performing the dissolution at a high temperature, the temperature is most often higher than the boiling point of the organic solvent used and in this case, the solvent is used in a pressurized state.

(Specific Method of Solution Film Formation)

As regards the method and apparatus for producing the cellulose acylate film of the present invention, a solution casting film-forming method and a solution casting film-forming apparatus conventionally used for the production of a cellulose acylate film may be used. The dope (cellulose acylate solution) prepared in a dissolving machine (kettle) is once stored in a storing kettle and finalized by removing bubbles contained in the dope. The dope is fed to a pressure-type die from the dope discharge port through, for example, a pressure-type quantitative gear pump capable of feeding a constant amount of liquid with high precision by the number of rotations and uniformly cast on an endlessly running metal support in the casting part from a mouth ring (slit) of the pressure-type die, and the damp-dry dope film (sometimes called web) is peeled off from the metal support at the peeling point after traveling nearly one round of the metal support. The obtained web is nipped with clips at both edges and dried in the course of conveyance by a tenter while keeping the width. Subsequently, the film is conveyed by a roll group of a drying apparatus to complete the drying and then taken up in a predetermined length by a take-up machine. The combination of the tenter and the drying apparatus comprising a roll group varies depending on the purpose. In the solution casting film-forming method used for the silver halide photographic light-sensitive material or the functional protective film for electronic displays, a coating apparatus is often added for applying surface processing to the film, such as subbing layer, antistatic layer, antihalation layer and protective layer, in addition to the solution casting film-forming apparatus. These production steps are described in detail in *JIII Journal of Technical Disclosure*, No. 2001-1745, pp. 25-30, Japan Institute of Invention and Innovation (Mar. 15, 2001) with categories of casting (including co-casting), metal support, drying, separation, stretching and the like.

<Treatment of Cellulose Acylate Film>

(Stretching)

The cellulose acylate film of the present invention produced as above by a melt film-forming method or a solution film-forming method is preferably further subjected to a stretching treatment. The stretching may be performed on-line in the film-forming process, or after the completion of film formation, the film may be once taken up and then stretched off-line. That is, in the case of melt film formation, the stretching may be performed before cooling in the film formation is not completed, or may be performed after the completion of cooling. The stretching is preferably performed at a temperature of from Tg to (Tg+50° C.), more preferably from Tg to (Tg+40° C.), still more preferably from Tg to (Tg+30° C.). The stretch ratio is preferably from 0.1 to 300%, more preferably from 10 to 200%, still more preferably from 30 to 100%. The stretching may be performed either in one stage or in multiple stages. The stretch ratio as used herein is a stretch ratio determined according to the following formula: stretch ratio (%)=100×{(length after stretching)−(length before stretching)}/length before stretching.

Such stretching is performed by longitudinal stretching, transverse stretching, or a combination thereof. In the longitudinal stretching, for example, (1) roll stretching (where stretching in the longitudinal direction is performed by using two or more pairs of nip rolls set to a higher peripheral speed on the outlet side; sometimes referred to as free-end stretching), and (2) fixed-end stretching (where stretching in the longitudinal direction is performed by grasping both ends of the film and conveying it while gradually increasing the speed along the longitudinal direction), may be used. Also, in the transverse stretching, for example, tenter stretching (where stretching is performed by grasping both ends of the film with a chuck and expanding it in the transverse direction (the direction perpendicular to the longitudinal direction)) may be used. The longitudinal stretching or transverse stretching may be performed alone (uniaxial stretching), or these may be performed in combination (biaxial stretching). In the case of biaxial stretching, the longitudinal stretching and the transverse stretching may be performed sequentially (sequential stretching) or at the same time (simultaneous stretching).

The stretching speed at the longitudinal stretching and transverse stretching is preferably from 10 to 10,000%/min, more preferably from 20 to 1,000%/min, still more preferably from 30 to 800%/min, In the case of multistage stretching, the stretching speed indicates the average value of stretching speeds at respective stages.

Following such stretching, relaxing of 0 to 10% in the longitudinal or transverse direction may be also preferably performed. Furthermore, it is also preferred to perform heat setting at a temperature of 150 to 250° C. for 1 second to 3 minutes subsequently to the stretching.

The film thickness after such stretching is preferably from 10 to 300 µm, more preferably from 20 to 200 µm, still more preferably from 30 to 100 µm.

The angle θ between the film-forming direction (longitudinal direction) and the slow axis of Re of the film is preferably closer to 0°, +90° or −90°. That is, in the case of longitudinal stretching, the angle is preferably closer to 0° and preferably 0±3°, more preferably 0±2°, still more preferably 0±1°. In the case of transverse stretching, the angle is preferably 90±3° or −90±3°, more preferably 90±2° or −90±2°, still more preferably 90±1° or −90±1°.

In the case where Re is produced due to a tension applied in the longitudinal direction of the film between casting and peeling, Re can be reduced close to 0 by performing stretching in the width direction in a tenter. At this time, the stretch ratio is preferably from 0.1 to 20%, more preferably from 0.5 to 10%, still more preferably from 1 to 5%. The stretching treatment may be performed in the middle of the film formation process, or a stock film produced and taken up may be stretched. In the former case, the film may be stretched in the state of containing a residual solvent and can be preferably stretched when the residual solvent amount is from 2 to 30 mass %.

The thickness of the cellulose acylate film obtained after drying varies depending on the intended use but is preferably from 5 to 500 μm, more preferably from 20 to 300 μm, still more preferably from 30 to 150 μm. In the case of optical use, particularly, for a VA liquid crystal display device, the film thickness is preferably from 40 to 110 μm. The film thickness may be adjusted to a desired thickness by controlling, for example, the concentration of solid contents contained in the dope, the slit gap of die mouth ring, the extrusion pressure from die, or the speed of metal support.

The cellulose acylate film of the present invention may be formed as a lengthy film, for example, as a lengthy film taken up in a width of 0.5 to 3 m (preferably from 0.6 to 2.5 m, more preferably from 0.8 to 2.2 m) and a length of 100 to 10,000 m (preferably from 500 to 7,000 m, more preferably from 1,000 to 6,000 m) per roll. At the time of taking up the film, knurling is preferably applied to at least one edge. The width of the knurl is preferably from 3 to 50 mm, more preferably from 5 to 30 mm, and the height is preferably from 0.5 to 500 μm, more preferably from 1 to 200 μm. The knurling may be applied by either one-sided pressing or double-sided pressing.

The above-described unstretched or stretched cellulose acylate film may be used by itself, may be used in combination with a polarizing plate, or may be used after providing thereon a liquid crystal layer, a layer having controlled refractive index (low reflection layer), or a hardcoat layer.

The Re and Rth of the cellulose acylate film of the present invention can be adjusted by the substitution degree of the substituent A, the substitution degree of the substituent B and the stretch ratio. Since the cellulose acylate film contains a cellulose acylate where the substitution degree of the substituent A satisfies formula (I) and the substitution degree of the substituent B satisfies formula (II), the absolute value of Re is increased by applying a stretching treatment. Specifically, the cellulose acylate film of the present invention can be a film exhibiting characteristics that Re is approximately from 0 to 400 nm and Rth is approximately from −200 to 200 nm. However, the optical characteristics of the cellulose acylate film of the present invention are not limited to these ranges.

The dispersion of the Re(590) value in the width direction of the film is preferably ±5 nm, more preferably ±3 nm. Also, the dispersion of the Rth(590) value in the width direction is preferably ±10 nm, more preferably ±5 nm. The dispersions of the Re value and Rth value in the length direction are also preferably in the ranges of dispersions in the width direction.

(Surface Treatment)

The unstretched or stretched cellulose acylate film is subjected to a surface treatment depending on the case, whereby adhesion between the cellulose acylate film and each functional layer (for example, an undercoat layer or a back layer) can be enhanced. For example, a glow discharge treatment, an ultraviolet irradiation treatment, a corona treatment, a flame treatment, or an acid or alkali treatment may be applied.

[Retardation Film]

The cellulose acylate film of the present invention can be used as a retardation film.

Also, the cellulose acylate film of the present invention is preferably combined with a functional group described in detail in *JIII Journal of Technical Disclosure*, No. 2001-1745, pp. 32-45, Japan Institute of Invention and Innovation (Mar. 15, 2001). Above all, it is preferred to impart a polarizing film (formation of a polarizing plate) or impart an optically compensatory layer composed of a liquid crystal composition (optically compensatory film).

[Optically Compensatory Film]

The cellulose acylate film of the present invention can be utilized for optical compensation of a liquid crystal display device. In the case where the cellulose acylate film of the present invention satisfies the optical characteristics necessary for optical compensation, the cellulose acylate film can be directly utilized as an optically compensatory film. Also, after one or more other layers, for example, an optically anisotropic layer formed by curing a liquid crystal composition or a layer composed of another birefringent polymer film, are stacked to satisfy the optical characteristics necessary for optical compensation, the cellulose acylate film can be utilized as an optically compensatory film.

(Production of Optically Anisotropic Layer A)

The method for producing an optically anisotropic layer A for use in the present invention, where the slow axis is at 45°±10° with respect to the film conveying direction and Re(548) is from 80 to 190, is described below. The optically anisotropic layer A for use in the present invention has a function of converting incident linearly-polarized light into circularly-polarized light and converting circularly-polarized light into linearly-polarized light.

<In Case of Production Using Rod-Like Liquid Crystal Compound>

In the rod-like liquid crystal layer for use in the present invention, (1) Re(548) is from 80 to 190 and (2) the slow axis is at 45°±10° with respect to the film conveying direction.

The characteristic (1) is determined by Δn of the rod-like liquid crystal used and the film thickness, and when Δn is from 0.01 to 0.50 and the film thickness is from 0.05 to 5 μm, the target optical characteristic can be realized.

The rod-like liquid crystalline compound usable for the retardation plate of the present invention is, as described above, a compound having a polymerizable group. The compound can be selected from the compounds described, for example, in *Makromol. Chem.*, Vol. 190, page 2255 (1989), *Advanced Materials*, Vol. 5, page 107 (1993), U.S. Pat. Nos. 4,683,327, 5,622,648 and 5,770,107, International Publication (WO) Nos. 95/22586, 95/24455, 97/00600, 98/23580 and 98/52905, JP-A-1-272551, JP-A-6-16616, JP-A-7-110469, JP-A-11-80081, JP-A-11-513019 and Japanese Patent Application 2001-64627.

The low molecular rod-like liquid crystalline compound is preferably a compound represented by the following formula (I):

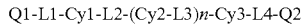

Q1-L1-Cy1-L2-(Cy2-L3)n-Cy3-L4-Q2  Formula (I):

wherein each of Q1 and Q2 independently represents a polymerizable group, each of L1 and L4 independently represents a divalent linking group, each of L2 and L3 independently represents a single bond or a divalent linking group, each of Cy1, Cy2 and Cy3 independently represents a divalent cyclic group, and n is 0, 1 or 2.

The polymerizable rod-like liquid crystalline compound is described below.

In the formula, each of Q1 and Q2 is independently a polymerizable group. The polymerization reaction of the polymerizable group is preferably addition polymerization (including ring-opening polymerization) or condensation polymerization. In other words, the polymerizable group is preferably a functional group capable of an addition polymerization reaction or a condensation polymerization reaction.

<In Case of Production Using Discotic Liquid Crystalline Compound>

[Discotic Liquid Crystalline Compound]

In the present invention, a discotic liquid crystalline compound is preferably used for the formation of the optically anisotropic layer of the optical film above. The discotic liquid crystalline compound is described in various publications (C. Destrade et al., *Mol. Crysr. Liq. Cryst.*, vol. 71, page 111

(1981); *Quarterly Journal of Chemical Review*, No. 22, "Chemistry of Liquid Crystal", Chap. 5 and Chap. 10, 2nd paragraph, compiled by The Chemical Society of Japan (1994); B. Kohne et al., *Angew. Chem. Soc. Chem. Comm.*, page 1794 (1985); J. Zhang et al., *J. Am. Chem. Soc.*, vol. 116, page 2655 (1994)). The polymerization of the discotic liquid crystalline compound is described in JP-A-8-27284.

Specific examples of the discotic liquid crystalline compound which can be preferably used in the present invention include the compounds illustrated in paragraphs [0038] to [0069] of JP-A-2009-97002. Also, examples of the discotic liquid crystalline compound having a small wavelength dispersion, which is a triphenylene compound, include the compounds illustrated in paragraphs [0062] to [0067] of JP-A-2007-108732.

[Vertical Alignment Accelerator]

At the formation of the optically anisotropic layer, for uniformly and vertically aligning the molecules of the liquid crystalline compound, an alignment controlling agent capable of controlling the liquid crystalline compound to vertically align on the orientation film interface side and the air interface side is preferably used. For this purpose, the optically anisotropic layer is preferably formed using a composition containing, together with a liquid crystalline compound, a compound which acts on the orientation film to vertically align the liquid crystalline compound by the excluded volume effect, electrostatic effect or surface energy effect. As for the alignment control on the air interface side, the optically anisotropic layer is preferably formed using a composition containing, together with a liquid crystalline compound, a compound which is unevenly distributed to the air interface during alignment of the liquid crystalline compound and has an action to vertically align the liquid crystalline compound by the excluded volume effect, electrostatic effect of surface energy effect. As such a compound capable of accelerating vertical alignment of liquid crystalline compound molecules on the orientation film interface side (orientation film interface-side vertically aligning agent), a pyridinium derivative is suitably used. As the compound capable of accelerating vertical alignment of the liquid crystalline compound molecules on the air interface side (air interface-side vertically aligning agent), a compound containing a fluoroaliphatic group and one or more hydrophilic groups selected from the group consisting of a carboxyl group (—COOH), a sulfo group (—SO$_3$H), a phosphonoxy group {—OP(=O)(OH)$_2$} and salts thereof, is suitably used. Also, by blending such a compound, for example, when the liquid crystalline composition is prepared as a coating solution, the coatability of the coating solution is improved and generation of unevenness or repelling is suppressed. The vertically aligning agent is described in detail below.

[Orientation Film Interface-Side Vertically Aligning Agent]

As the orientation interface-side vertically aligning agent usable in the present invention, a pyridinium derivative (pyridinium salt) is suitably used, and specific examples of the compound include the compound described in paragraphs [0058] to [0061] of JP-A-2006-113500.

The preferred content of the pyridinium derivative in the composition for optically anisotropic layer formation varies depending on the use, but the content is preferably from 0.005 to 8 mass %, more preferably from 0.01 to 5 mass %, based on the composition (when prepared as a coating solution, the liquid crystalline composition excluding the solvent).

[Air Interface Side Vertically Aligning Agent]

As the air interface-side vertically aligning agent for use in the present invention, a fluorine-containing compound represented by the following fluorine-based polymer (containing formula (II) as a partial structure) is suitably used.

The fluorine-based polymer (containing formula (II) as a partial structure) is described below. As the air interface-side vertically aligning agent for use in the present invention, the fluorine-based polymer is preferably a copolymer containing a repeating unit derived from a fluoroaliphatic group-containing monomer and a repeating unit represented by the following formula (II):

Formula (II)

wherein each of $R^1$, $R^2$ and $R^3$ independently represents a hydrogen atom or a substituent; L represents a divalent linking group selected from the following linking group family or a divalent linking group formed by a combination of two or more selected from the following linking group family, (Linking Group Family)

single bond, —O—, —CO—, —NR$^4$— (R$^4$ represents a hydrogen atom, an alkyl group, an aryl group or an aralkyl group), —S—, —SO$_2$—, —P(=O)(OR$^5$)— (R$^5$ represents an alkyl group, an aryl group or an aralkyl group), an alkylene group and an arylene group;

Q represents a carboxyl group (—COOH) or a salt thereof, a sulfo group (—SO$_3$H) or a salt thereof, or a phosphonoxy group {—OP(=O)(OH)$_2$} or a salt thereof.

The fluorine-based polymer usable in the present invention is characterized by containing a fluoroaliphatic group and one or more hydrophilic groups selected from the group consisting of a carboxyl group (—COOH), a sulfo group (—SO$_3$H), a phosphonoxy group {—OP(=O)(OH)$_2$} and salts thereof. The kind of the polymer is described in Takayuki Ohtsu, *Kaitei Kobunshi Gousei no Kagaku (Revision Chemistry of Polymer Synthesis)*, pp. 1-4, Kagaku-Dojin (1968), and examples thereof include polyolefins, polyesters, polyamides, polyimides, polyurethanes, polycarbonates, polysulfones, polyethers, polyacetals, polyketones, polyphenylene oxides, polyphenylene sulfides, polyarylates, PTFEs, polyvinylidene fluorides and cellulose derivatives. The fluorine-based polymer is preferably polyolefins.

The fluorine-based polymer is a polymer having a fluoroaliphatic group in the side chain. The fluoroaliphatic group preferably has a carbon number of 1 to 12, more preferably from 6 to 10. The aliphatic group may have a chain or cyclic aliphatic group, and the chain aliphatic group may be linear or branched. Among those, a linear fluoroaliphatic group having a carbon number of 6 to 10 is preferred. The degree of substitution with a fluorine atom is not particularly limited, but a fluorine atom preferably substitutes for 50% or more of hydrogen atoms, more preferably 60% or more of hydrogen atoms, in the aliphatic group. In the side chain bonded to the main chain of the polymer, the fluoroaliphatic group is contained through an ester bond, an amide bond, an imido bond, a urethane bond, a urea bond, an ether bond, a thioether bond, an aromatic ring or the like.

Specific examples of the fluoroaliphatic group-containing copolymer which is preferably used as the fluorine-based polymer in the present invention include the compound illustrated in paragraphs [0110] to [0114] of JP-A-2006-113500, but the present invention is not limited to these specific example by any means.

The mass average molecular weight of the fluorine-based polymer for use in the present invention is preferably 1,000,000 or less, more desirably 500,000 or less, still more preferably 100,000 or less. The mass average molecular weight can be measured as a value in terms of polystyrene (PS) by using gel permeation chromatography (GPC).

Incidentally, as the fluorine-based polymer for use in the present invention, a polymer having, as a substituent, a polymerizable group for fixing the aligned state of the discotic liquid crystalline compound is also preferred.

The preferred content of the fluorine-based polymer in the composition varies depending on the use, but in the case of using the composition for optically anisotropic layer formation, the content is preferably from 0.005 to 8 mass %, more preferably from 0.01 to 5 mass %, still more preferably from 0.05 to 3 mass %, based on the composition (in the case of a coating solution, the composition excluding the solvent). If the amount of the fluorine-based polymer added is less than 0.005 mass %, the effect is insufficient, whereas if it exceeds 8 mass %, this gives rise to insufficient drying of the coating film or adversely affects the performance (for example, uniformity of retardation) as an optical film.

A fluorine-containing compound represented by the following formula (III):

   (III)

wherein $R^0$ represents an alkyl group, an alkyl group having a $CF_3$ group at the terminal, or an alkyl group having a $CF_2H$ group at the terminal, m represents an integer of 1 or more, each $R^0$ may be the same as or different from every other $R^0$ but at least one represents an alkyl group having a $CF_3$ group or a $CF_2H$ group at the terminal, $L^0$ represents a (m+n)-valent linking group, W represents a carboxyl group (—COOH) or a salt thereof, a sulfo group (—$SO_3$H) or a salt thereof, or a phosphonoxy group {—OP(=O)(OH)$_2$} or a salt thereof, and n represents an integer of 1 or more.

Specific examples of the fluorine-containing compound represented by formula (III) which can be used in the present invention include the compound illustrated in paragraph [0136] to [0140] of JP-A-2006-113500, but the present invention is not limited to these specific examples by any means.

Incidentally, as the fluorine-containing compound for use in the present invention, a compound having, as a substituent, a polymerizable group for fixing the aligned state of the discotic liquid crystalline compound is also preferred The preferred content of the fluorine-containing compound in the composition varies depending on the use, but in the case of using the composition for optically anisotropic layer formation, the content is preferably from 0.005 to 8 mass %, more preferably from 0.01 to 5 mass %, still more preferably from 0.05 to 3 mass %, based on the composition (in the case of a coating solution, the composition excluding the solvent).

[Polymerization Initiator]

The aligned (preferably vertically aligned) liquid crystalline compound is fixed while maintaining the aligned state. The fixing is preferably effected by a polymerization reaction of a polymerizable group (P) introduced in the liquid crystalline compound. The polymerization reaction includes a thermal polymerization reaction using a thermal polymerization initiator and a photopolymerization reaction using a photopolymerization initiator. A photopolymerization reaction is preferred. Examples of the photopolymerization initiator include an α-carbonyl compound (described in U.S. Pat. Nos. 2,367,661 and 2,367,670), an acyloin ether (described in U.S. Pat. No. 2,448,828), an α-hydrocarbon-substituted aromatic acyloin compound (described in U.S. Pat. No. 2,722,512), a polynuclear quinone compound (described in U.S. Pat. Nos. 3,046,127 and 2,951,758), a combination of triarylimidazole dimer and p-aminophenyl ketone (described in U.S. Pat. No. 3,549,367), an acridine or phenazine compound (described in JP-A-60-105667 and U.S. Pat. No. 4,239,850), and an oxadiazole compound (described in U.S. Pat. No. 4,212,970).

The amount of the photopolymerization initiator used is preferably from 0.01 to 20 mass %, more preferably from 0.5 to 5 mass %, based on the solid content of the coating solution. The light irradiation for polymerizing the liquid crystalline molecule preferably uses an ultraviolet ray. The irradiation energy is preferably from 20 mJ/cm² to 50 J/cm², more preferably from 100 to 800 mJ/cm². In order to accelerate the photopolymerization reaction, the light irradiation may be performed under heating conditions or in an atmosphere with a low oxygen concentration of 0.1% or less. The thickness of the optically anisotropic layer containing the liquid crystalline compound is preferably from 0.1 to 10 μm, more preferably from 0.5 to 5 μm, and most preferably from 1 to 5 μm.

[Other Additives of Optically Anisotropic Layer]

The uniformity of the coated film, the strength of the film, the aligning property of the liquid crystalline compound, and the like can be enhanced by using, for example, a plasticizer, a surfactant and a polymerizable monomer together with the liquid crystalline compound. These materials preferably have compatibility with the liquid crystalline compound and do not inhibit the alignment.

The polymerizable monomer includes a radical polymerizable compound and a cation polymerizable compound and is preferably a polyfunctional radical polymerizable monomer, and a monomer copolymerizable with the above-described polymerizable group-containing liquid crystal compound is preferred. Examples thereof include those illustrated in paragraphs [0018] to [0020] of JP-A-2002-296423. The amount of the compound added is generally from 1 to 50 mass %, preferably from 5 to 30 mass %, based on the liquid crystalline molecules.

The surfactant include conventionally known compounds but is preferably a fluorine-containing compound. Specific examples thereof include the compounds illustrated in paragraphs [0028] to [0056] of JP-A-2001-330725 and the compounds illustrated in paragraphs [0069] to [0126] of Japanese Patent Application No. 2003-295212.

The polymer used together with the liquid crystalline compound is preferably capable of thickening the coating solution. Examples of the polymer include a cellulose ester. Preferred examples of the cellulose ester include those illustrated in paragraph [0178] of JP-A-2000-155216. In order not to inhibit the alignment of the liquid crystalline compound, the amount of the polymer added is preferably from 0.1 to 10 mass %, more preferably from 0.1 to 8 mass %, based on the liquid crystalline molecules.

The discotic nematic liquid crystal phase-solid phase transition temperature of the liquid crystalline compound is preferably from 70 to 300° C., more preferably from 70 to 170° C.

[Coating Solvent]

As the solvent for use in the preparation of a coating solution, an organic solvent is preferably used. Examples of the organic solvent include an amide (e.g., N,N-dimethylformamide), a sulfoxide (e.g., dimethyl sulfoxide), a heterocyclic compound (e.g., pyridine), a hydrocarbon (e.g., benzene, hexane), an alkyl halide (e.g., chloroform, dichloromethane), an ester (e.g., methyl acetate, ethyl acetate, butyl acetate), a ketone (e.g., acetone, methyl ethyl ketone), and an ether (e.g., tetrahydrofuran, 1,2-dimethoxyethane). An alkyl halide and a ketone are preferred. Two or more kinds of organic solvents may be used in combination.

[Coating Method]

The coating solution can be coated by a known method (for example, a wire bar coating method, an extrusion coating method, a direct gravure coating method, a reverse gravure coating method, or a die coating method).

[Orientation Film]

In the present invention, the above-described composition is preferably coated on the surface of an orientation film to align the liquid crystalline compound molecules. The orientation film has a function of regulating the alignment direction of the liquid crystalline compound and is preferably used for realizing the preferred embodiment of the present invention. However, once the aligned state is fixed after alignment of the liquid crystalline compound, the orientation film has fulfilled its function and is not essential as a constituent element. That is, only the optically anisotropic layer in a fixed alignment state on the orientation film may be transferred onto another transparent support to produce an optical substrate for the optical film of the present invention.

The orientation film may be provided by a method such as rubbing of an organic compound (preferably a polymer), oblique vapor deposition of an inorganic compound, formation of a microgroove-containing layer, and accumulation of an organic compound (e.g., ω-tricosanoic acid, dioctadecylmethylammonium chloride, methyl stearate) by the Langmuir-Blodgett method (LB film). Furthermore, there is also known an orientation film which exerts an aligning function when imparted with an electric field or magnetic field or irradiated with light. It is preferable that the orientation film is formed by a rubbing treatment of a polymer.

Examples of the polymer include the methacrylate-based copolymers described in paragraph [0022] of JP-A-8-338913, a styrene-based copolymer, a polyolefin, a polyvinyl alcohol, a modified polyvinyl alcohol, a poly(N-methylolacrylamide), a polyester, a polyimide, a vinyl acetate copolymer, a carboxymethyl cellulose, and a polycarbonate. A silane coupling agent may be used as the polymer. A water-soluble polymer (e.g., poly(N-methylolacrylamide), carboxymethyl celluloses, gelatin, polyvinyl alcohol, modified polyvinyl alcohol) is preferred; gelatin, a polyvinyl alcohol, and a modified polyvinyl alcohol are more preferred; and a polyvinyl alcohol and a modified polyvinyl alcohol are most preferred.

The saponification degree of the polyvinyl alcohol is preferably from 70 to 100%, more desirably from 80 to 100%. The polymerization degree of the polyvinyl alcohol is preferably from 100 to 5,000.

In the orientation film, it is preferred to bond a side chain having a crosslinking functional group (e.g., double bond) to the main chain or introduce, into the side chain, a crosslinking functional group having a function of aligning liquid crystal molecules. As the polymer used for the orientation film, either a polymer capable of crosslinking by itself or a polymer caused to undergo crosslinking by a crosslinking agent may be used, and a combination of a plurality of these polymers may be used.

When a side chain having a crosslinking functional group is bonded to the main chain of the orientation film polymer or a crosslinking functional group is introduced into the side chain having a function of aligning the liquid crystal molecules, a polymer of the orientation film and a polyfunctional monomer contained in the optically anisotropic layer can be copolymerized. As a result, a strong bond is formed by covalent bonding not only between a polyfunctional monomer and a polyfunctional monomer but also between an orientation polymer and an orientation polymer and between a polyfunctional monomer and an orientation film polymer. Accordingly, the strength of the optically compensatory sheet can be remarkably improved by introducing a crosslinking functional group into the orientation film polymer.

The crosslinking functional group of the orientation film polymer preferably contains a polymerizable group, similarly to the polyfunctional monomer. Specific examples thereof include those illustrated in paragraphs [0080] to [0100] of JP-A-2000-155216.

The orientation polymer may be also crosslinked by using a crosslinking agent separately from the above-described crosslinking functional group. Examples of the crosslinking agent include an aldehyde, an N-methylol compound, a dioxane derivative, a compounds capable of acting resulting from activation of a carboxyl group, an active vinyl compound, an active halogen compound, an isoxazole, and a dialdehyde starch. Two or more kinds of crosslinking agents may be used in combination. Specific examples thereof include the compounds illustrated in paragraphs [0023] and [0024] of JP-A-2002-62426. An aldehyde with high reaction activity is preferred, and glutaraldehyde is more preferred.

The amount of the crosslinking agent added is preferably from 0.1 to 20 mass %, more preferably from 0.5 to 15 mass %, based on the polymer. The amount of the unreacted crosslinking agent remaining in the orientation film is preferably 1.0 mass % or less, more preferably 0.5 mass % or less. By adjusting the amounts as above, sufficiently high durability allowing no generation of reticulation even when the orientation film is used in a liquid crystal display device for a long time or left standing still in a high-temperature high-humidity atmosphere for a long time, can be obtained.

Basically, a solution containing the above-described polymer as an orientation film-forming material, a crosslinking agent and an additive is coated on a transparent support and dried under heating (crosslinked), and the resulting film is rubbed, whereby the orientation film can be formed. The crosslinking reaction may be performed, as described above, at an arbitrary time after coated on the transparent support. In the case of using a water-soluble polymer such as polyvinyl alcohol for the orientation film-forming material, the coating solution is preferably prepared using a mixed solvent of water and an organic solvent having a defoaming action (e.g., methanol). The ratio water:methanol is, in terms of mass ratio, preferably from 0:100 to 99:1, more preferably from 0:100 to 91:9. Within this range, generation of bubbles is suppressed, and the defect on the layer surface of the orientation film and in turn, the optically anisotropic layer is significantly reduced.

The coating method utilized when forming the orientation film is preferably a spin coating method, a dip coating method, a curtain coating method, an extrusion coating method, a rod coating method or a roll coating method, more preferably a rod coating method. The film thickness after drying is preferably from 0.1 to 10 μm. The drying under heating may be performed at 20 to 110° C. In order to achieve sufficient crosslinking, the drying temperature is preferably from 60 to 100° C., more preferably from 80 to 100° C. The drying time may be from 1 minute to 36 hours but is preferably from 1 to 30 minutes. The pH is also preferably set to an optimal value for the crosslinking agent used and in the case of using glutaraldehyde, the pH is preferably from 4.5 to 5.5.

The orientation film is preferably provided on a transparent support. The orientation film can be obtained by crosslinking the polymer layer as described above and then applying a rubbing treatment to the surface.

As the rubbing treatment, a treatment method widely employed as a treatment process for liquid crystal alignment of LCD may be applied. That is, a method of rubbing the orientation film surface in a fixed direction with paper, gauze, felt, rubber or a nylon or polyester fiber, thereby obtaining alignment, may be used. In general, the treatment is practiced by performing the rubbing several times with use of, for example, a cloth having averagely implanted therein fibers of uniform length and size.

The above-described composition is coating on the rubbing treated surface of the orientation film to align the molecules of the liquid crystalline compound. Thereafter, if desired, the orientation film polymer and a polyfunctional monomer contained in the optically anisotropic layer are reacted, or the orientation film polymer is crosslinked by using a crosslinking agent, whereby the optically anisotropic layer can be formed.

<In Case of Production Using Cycloolefin-Based Polymer>

The layer having Re(548) of 80 to 190 may be also formed by stretching a cycloolefin-based polymer in the oblique direction with respect to the film conveying direction. For example, the layer can be produced by the method described in paragraphs [0019] to [0090] of Japanese Patent 4,557,188.

(Optically Anisotropic Layer B)

The C plate coming under the optically anisotropic layer B for use in the present invention means a film satisfying $-10 \text{ nm} \leq \text{Re}(548) \leq 10$ nm and $\text{Nz} \geq 10$. Here, $\text{Nz}=(nx-nz)/(nx-ny)$, wherein nx, ny and nz represent the refractive indexes in the film conveying direction, the direction perpendicular to the film conveying direction, and the thickness direction, respectively.

As for the wavelength dispersion, Rth of the C plate for use in the present invention may exhibit either forward dispersibility or reverse dispersibility. Here, the forward dispersibility refers to a property of decreasing in the Rth value as the wavelength becomes larger, and the reverse dispersibility refers to a property of increasing in the Rth value as the wavelength becomes larger. In general, the VA-mode liquid crystal exhibits forward dispersibility and therefore, from the standpoint of compensating for the viewing angle tint, Rth of the C plate preferably exhibits forward dispersibility.

The C plate for use in the present invention may be formed by various methods, for example, a method of polymerizing a discotic compound in a state of being aligned and fixing the alignment in a horizontal direction, or a method of adding a retardation adjusting agent to a cellulose acylate-based film, but the present invention is not limited to these methods.

<In Case of Production Using Discotic Liquid Crystal Compound>

In the present invention, the optically anisotropic layer composed of a discotic liquid crystalline compound contains a discotic liquid crystalline compound and at least one of the later-described compounds represented by formulae (I), (II) and (III).

The discotic liquid crystalline compound can be oriented substantially in horizontal alignment with respect to the polymer film surface by using at least one of the compounds represented by formulae (I) to (III) in combination. The term "substantially in horizontal alignment" means that the average angle (average tilt angle) between the disc plane of the discotic liquid crystalline compound and the surface of the optically anisotropic layer is from 0 to 10°.

As for the discotic liquid crystalline compound, those described in various publications (C. Destrade et al., *Mol. Crysr. Liq. Cryst.*, vol. 71, page 111 (1981); Quarterly *Journal of Chemical Review*, No. 22, "Chemistry of Liquid Crystal", Chap. 5 and Chap. 10, 2nd paragraph, compiled by The Chemical Society of Japan (1994); B. Kohne et al., *Angew. Chem. Soc. Chem. Comm.*, page 1794 (1985); J. Zhang et al., *J. Am. Chem. Soc.*, vol. 116, page 2655 (1994)) may be widely employed. As for the polymerization method of the discotic liquid crystalline compound, the method described, for example, in JP-A-8-27284 can be employed.

The discotic liquid crystalline compound preferably has a polymerizable group so as to enable fixing by polymerization. For example, there may be considered a structure where a polymerizable group is bonded as a substituent to the discotic core of the discotic liquid crystalline compound. A structure having a linking group between the discotic core and the polymerizable group is more preferred. When a structure having a linking group is employed, it becomes more easy to keep the aligned state in the polymerization reaction. The discotic liquid crystalline compound having a polymerizable group is preferably a compound represented by the following formula (VI):

$$D(\text{-L-P})_n \qquad \text{Formula (VI):}$$

(wherein D is a discotic core, L is a divalent linking group, P is a polymerizable group, and n is an integer of 4 to 12).

As the discotic core (D), divalent linking group (L) and polymerizable group (P) in formula (VI), for example, (D1) to (D15), (L1) to (L25), and (P1) to (P-18) described in JP-A-2001-4837 can be used. Specifically, the compound includes TE-8 shown below.

TE-8

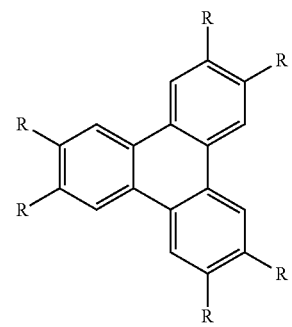

(1)

($m$ = an integer of 2 to 15)

(2)

(3)

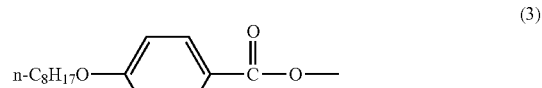

(4)

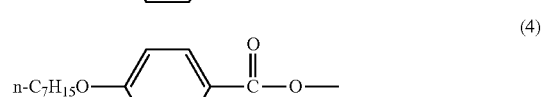

(5)

-continued

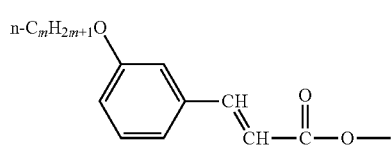

(6)

(m = an integer of 7 to 10)

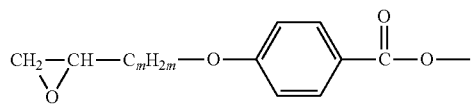

(7)

(m = an integer of 4 to 10)

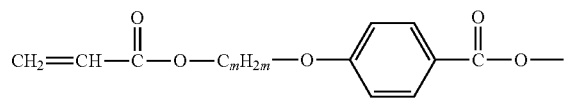

(8)

(m = an integer of 4 to 10)

The discotic liquid crystalline compound having a polymerizable groups is also oriented substantially in horizontal alignment, similarly to the above. As for specific examples of the discotic liquid crystalline compound in this case, those described in International Publication WO01/88574A1, page 58 line 6 to page 65, line 8, may be also preferably employed.

[Horizontally Aligning Agent]

The discotic liquid crystalline compound forming the optically anisotropic layer can be oriented substantially in horizontal alignment by using at least one of the compounds represented by the following formulae (I) to (III) in combination. The term "horizontal alignment" as used in the present invention indicates that the major axis direction (that is, the core disc plane) of the discotic liquid crystalline compound is parallel to the horizontal surface of the liquid crystal layer (for example, when the liquid crystal layer is formed on the support, the support surface), but it is not required to be strictly parallel, and in the description of the present invention, the term means alignment where the tilt angle between the core disc plane and the horizontal surface is less than 10°. The tilt angle is preferably 5° or less, more preferably 3° or less, still more preferably 2° or less, and most preferably 1° or less. The tilt angle may be 0°.

Formulae (I) to (III) are described in sequence below.

Formula (I):

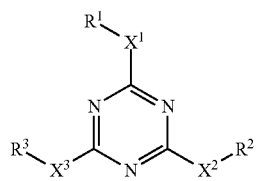

wherein each of $R^1$, $R^2$ and $R^3$ independently represents a hydrogen atom or a substituent, and each of $X^1$, $X^2$ and $X^3$ represents a single bond or a divalent linking group.

Formula (II):

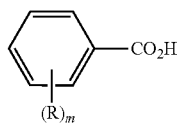

wherein R represents a substituent, m represents an integer of 0 to 5, and when m represents an integer of 2 or more, each R may be the same as or different from every other R.

Formula (III):

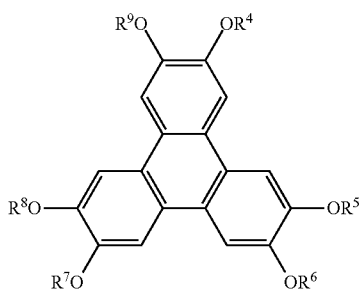

wherein each of $R^4$, $R^5$, $R^6$, $R^7$, $R^8$ and $R^9$ independently represents a hydrogen atom or a substituent.

The compounds represented by formulae (I) to (III) are described in detail below.

First, the compound represented by formula (I) is described.

Examples of the substituent represented by each of $R^1$, $R^2$ and $R^3$ include an alkyl group (preferably an alkyl group having a carbon number of 1 to 40, more preferably a carbon number of 1 to 30, still more preferably a carbon number of 1 to 20, e.g., methyl group, ethyl group, isopropyl group, tert-butyl group, n-octyl group, n-decyl group, n-hexadecyl group, cyclopropyl group, cyclopentyl group, cyclohexyl group), an alkenyl group (preferably an alkenyl group having a carbon number of 2 to 40, more preferably a carbon number of 2 to 30, still more preferably a carbon number of 2 to 20, e.g., vinyl group, allyl group, 2-butenyl group, 3-pentenyl group), an alkynyl group (preferably an alkynyl group having a carbon number of 2 to 40, more preferably a carbon number of 2 to 30, still more preferably a carbon number of 2 to 20, e.g., propargyl group, 3-pentynyl group), an aryl group (preferably an aryl group having a carbon number of 6 to 30, more preferably a carbon number of 6 to 20, still more preferably a carbon number of 6 to 12, e.g., phenyl group, p-methylphenyl group, naphthyl group), a substituted or unsubstituted amino group (preferably an amino group having a carbon number of 0 to 40, more preferably a carbon number of 0 to 30, still more preferably a carbon number of 0 to 20, e.g., unsubstituted amino group, methylamino group, dimethylamino group, diethylamino group, anilino group), an alkoxy group (preferably an alkoxy group having a carbon number of 1 to 40, more preferably a carbon number of 1 to 30, still more preferably a carbon number of 1 to 20, e.g., methoxy group, ethoxy group, butoxy group), an aryloxy group (preferably an aryloxy group having a carbon number of 6 to 40, more preferably a carbon number of 6 to 30, still more preferably a carbon number of 6 to 20, e.g., phenyloxy group, 2-naphthyloxy group), an acyl group (preferably an acyl group having a carbon number of 1 to 40, more preferably a carbon number of 1 to 30, still more preferably a carbon number of 1 to 20, e.g., acetyl group, benzoyl group, formyl group, pivaloyl group), an alkoxycarbonyl group (preferably an alkoxycarbonyl group having a carbon number of 2 to 40, more preferably a carbon number of 2 to 30, still more preferably a carbon number of 2 to 20, e.g., methoxycarbonyl group, ethoxycarbonyl group), an aryloxycarbonyl group (preferably an aryloxycarbonyl group having a carbon number of 7 to 40, more preferably a carbon number of 7 to 30, still more preferably a carbon number of 7 to 20, e.g., phenyloxycarbonyl group), an acyloxy group (preferably an acyloxy group having a carbon number of 2 to 40, more preferably a carbon number of 2 to 30, still more preferably a carbon number of 2 to 20, e.g., acetoxy group, benzoyloxy group), an acylamino group (preferably an acylamino group having a carbon number of 2 to 40, more preferably a carbon number of 2 to 30, still more preferably a carbon number of 2 to 20, e.g., acetylamino group, benzoylamino group), an alkoxycarbonylamino group (preferably an alkoxycarbonylamino group having a carbon number of 2 to 40, more preferably a carbon number of 2 to 30, still more preferably a carbon number of 2 to 20; e.g., methoxycarbonylamino group), an aryloxycarbonylamino group (preferably an aryloxycarbonylamino group having a carbon number of 7 to 40, more preferably a carbon number of 7 to 30, still more preferably a carbon number of 7 to 20, e.g., phenyloxycarbonylamino group), a sulfonylamino group (preferably a sulfonylamino group having a carbon number of 1 to 40, more preferably a carbon number of 1 to 30, still more preferably a carbon number of 1 to 20, e.g., methanesulfonylamino group, benzenesulfonylamino group), a sulfamoyl group (preferably a sulfamoyl group having a carbon number of 0 to 40, more preferably a carbon number of 0 to 30, still more preferably a carbon number of 0 to 20, e.g., sulfamoyl group, methylsulfamoyl group, dimethylsulfamoyl group, phenylsulfamoyl group), a carbamoyl group (preferably a carbamoyl group having a carbon number of 1 to 40, more preferably a carbon number of 1 to 30, still more preferably a carbon number of 1 to 20, e.g., unsubstituted carbamoyl group, methylcarbamoyl group, diethylcarbamoyl group, phenylcarbamoyl group), an alkylthio group (preferably having a carbon number of 1 to 40, more preferably a carbon number of 1 to 30, still more preferably a carbon number of 1 to 20, e.g., methylthio group, ethylthio group, propylthio group, butylthio group), an arylthio group (preferably having a carbon number of 6 to 40, more preferably a carbon number of 6 to 30, still more preferably a carbon number of 6 to 20, e.g., phenylthio group, naphtylthio group), a sulfonyl group (preferably a sulfonyl group having a carbon number of 1 to 40, more preferably a carbon number of 1 to 30, still more preferably a carbon number of 1 to 20, e.g., mesyl group, tosyl group), a sulfinyl group (preferably a sulfinyl group having a carbon number of 1 to 40, more preferably a carbon number of 1 to 30, still more preferably a carbon number of 1 to 20, e.g., methanesulfinyl group, benzenesulfinyl group), a ureido group (preferably a ureido group having a carbon number of 1 to 40, more preferably a carbon number of 1 to 30, still more preferably a carbon number of 1 to 20, e.g., unsubstituted ureido group, methylureido group, phenylureido group), a phosphoric acid amide group (preferably a phosphoric acid amide group having a carbon number of 1 to 40, more preferably a carbon number of 1 to 30, still more preferably a carbon number of 1 to 20, e.g., diethylphosphoric acid amide group, phenylphosphoric acid amide group), a hydroxy group, a mercapto group, a halogen atom (e.g., fluorine atom, chlorine atom, bromine atom, iodine atom), a cyano group, a sulfo group, a carboxyl group, a nitro group, a hydroxamic acid group, a sulfino group, a hydrazino group, an imino group, a heterocyclic group (preferably a heterocyclic group having a carbon number of 1 to 30, more preferably a carbon number of 1 to 12, for example, a heterocyclic group having a heteroatom such as nitrogen atom, oxygen atom and sulfur atom, e.g., imidazolyl group, pyridyl group, quinolyl group, furyl group, piperidyl group, morpholino group, benzoxazolyl group, benzimidazolyl group, benzothiazolyl group, 1,3,5-triazyl group), and a silyl group (preferably a silyl group having a carbon number of 3 to 40, more preferably a carbon number of 3 to 30, still more preferably a carbon number of 3 to 24; e.g., trimethylsilyl group, triphenylsilyl group). These substituents may be further substituted with a substituent. Also, in the case of having two or more substituents, these substituents may be the same or different and, if possible, may combine with each other to form a ring.

The substituent represented by each of $R^1$, $R^2$ and $R^3$ is preferably an alkyl group, an aryl group, a substituted or unsubstituted amino group, an alkoxy group, an alkylthio group or a halogen atom.

The divalent linking group represented by each of $X^1$, $X^2$ and $X^3$ is preferably a divalent linking group selected from the group consisting of an alkylene group, an alkenylene group, a divalent aromatic group, a divalent heterocyclic residue, —CO—, —NR$^a$— (R$^a$ is an alkyl group having a carbon number of 1 to 5), —O—, —S—, —SO—, —SO$_2$— and a combination thereof. The divalent linking group is more preferably an alkylene group, a phenyl group, —CO—, —NR$^a$—, —O—, —S—, —SO$_2$—, or a group formed by combining at least two divalent linking groups selected from the group consisting of them. The carbon number of the alkylene group is preferably from 1 to 12, the carbon number of the alkenylene group is preferably from 2 to 12, and the carbon number of the divalent aromatic group is preferably from 6 to 10. Each of the alkylene group, the alkenylene group and the divalent aromatic group may be, if possible, substituted with a group exemplified as the substituent of R', $R^2$ and $R^3$ (for example, an alkyl group, a halogen atom, cyano, an alkoxy group or an acyloxy group).

Among the compounds represented by formula (I), the compound represented by the following formula (Ia) or (Ib) is preferred.

Formula (Ia):

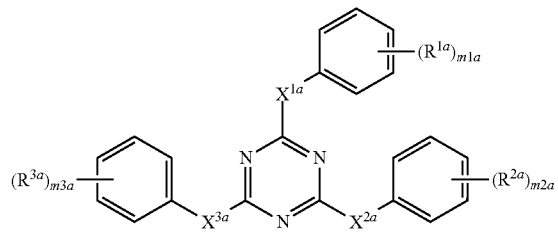

wherein each of $R^{1a}$, $R^{2a}$ and $R^{3a}$ represents a hydrogen atom or a substituent, each of $X^{1a}$, $X^{2a}$ and $X^{3a}$ represents —NH—, —O— or —S—, and each of m1a, m2a and m3a represents an integer of 1 to 3.

Formula (Ib):

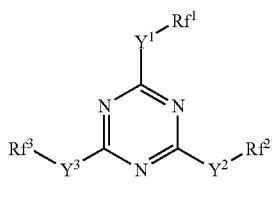

wherein each of $Rf^1$, $Rf^2$ and $Rf^3$ represents an alkyl group having a $CF_3$ group or a $CF_2H$ group at the terminal, and each of $Y^1$, $Y^2$ and $Y^3$ represents an alkylene group, —CO—, —NH—, —O—, —S—, —SO$_2$—, or a group formed by combining at least two divalent linking groups elected from the group consisting of them.

The compound represented by formula (Ia) is described below.

The substituent represented by each of $R^{1a}$, $R^{2a}$ and $R^{3a}$ has the same meaning as $R^1$, $R^2$ and $R^3$ in formula (I), and its preferred range is also the same. The substituent represented by each of $R^{1a}$, $R^{2a}$ and $R^{3a}$ is preferably an alkoxy group having a $CF_3$ group or a $CF_2H$ group at the terminal. The alkyl chain contained in the alkoxy group may be linear or branched and preferably has a carbon number of 4 to 20, more preferably from 4 to 16, still more preferably 6 to 16. The alkoxy group having a $CF_3$ group or a $CF_2H$ group at the terminal is an alkoxy group where a part or all of the hydrogen atoms contained in the alkoxy group are substituted for by a fluorine atom. A fluorine atom preferably substitutes for 50% or more, more preferably 60% or more, still more preferably 70% or more, of the hydrogen atom in the alkoxy group. Examples of the alkoxy group having a $CF_3$ group or a $CF_2H$ group at the terminal represented by $R^{1a}$, $R^{2a}$ and $R^{3a}$ are illustrated below.

| | |
|---|---|
| $n$-C$_8$F$_{17}$—O— | R1: |
| $n$-C$_6$F$_{13}$—O— | R2: |
| $n$-C$_4$F$_9$—O— | R3: |
| $n$-C$_8$F$_{17}$—(CH$_2$)$_2$—O—(CH$_2$)$_2$—O— | R4: |
| $n$-C$_6$F$_{13}$—(CH$_2$)$_2$—O—(CH$_2$)$_2$—O— | R5: |
| $n$-C$_4$F$_9$—(CH$_2$)$_2$—O—(CH$_2$)$_2$—O— | R6: |
| $n$-C$_8$F$_{17}$—(CH$_2$)$_3$—O— | R7: |
| $n$-C$_6$F$_{13}$—(CH$_2$)$_3$—O— | R8: |
| $n$-C$_4$F$_9$—(CH$_2$)$_3$—O— | R9: |
| H—(CF$_2$)$_6$—O— | R11: |

Each of $X^{1a}$, $X^{2a}$ and $X^{3a}$ preferably represents —NH— or —O— and most preferably represents —NH—. Each of m1a, m2a and m3a is preferably 2.

The compound represented by formula (Ib) is described below.

The alkyl group having a $CF_3$ group or a $CF_2H$ group a the terminal represented by Rf1, Rf2 and Rf3 may be linear or branched and preferably has a carbon number of 4 to 20, more preferably from 4 to 16, still more preferably 6 to 16. The alkyl group may have a substituent other than a $CF_3$ group or a $CF_2H$ group. The alkyl group having a $CF_3$ group or a $CF_2H$ group at the terminal is an alkyl group where a part or all of the hydrogen atoms contained in the alkyl group are substituted for by a fluorine atom. A fluorine atom preferably substitutes for 50% or more, more preferably 60% or more, still more preferably 70% or more, of the hydrogen atom in the alkyl group. Examples of the alkyl group having a $CF_3$ group or a $CF_2H$ group at the terminal represented by Rf1, Rf2 and Rf3 are illustrated below.

| | |
|---|---|
| $n$-C$_8$F$_{17}$— | Rf1: |
| $n$-C$_6$F$_{13}$— | Rf2: |
| $n$-C$_4$F$_9$— | Rf3: |
| $n$-C$_8$F$_{17}$—(CH$_2$)$_2$— | Rf4: |
| $n$-C$_6$F$_{13}$—(CH$_2$)$_2$— | Rf5: |
| $n$-C$_4$F$_9$—(CH$_2$)$_2$— | Rf6: |
| H—(CF$_2$)$_8$— | Rf7: |
| H—(CF$_2$)$_6$— | Rf8: |
| H—(CF$_2$)$_4$— | Rf9: |
| H—(CF$_2$)$_8$—(CH$_2$)— | Rf10: |
| H—(CF$_2$)$_6$—(CH$_2$)— | Rf11: |
| H—(CF$_2$)$_4$—(CH$_2$)— | Rf12: |

Each of $Y^1$, $Y^2$ and $Y^3$ preferably represents an alkylene group, —NH—, —O—, —S—, or a group formed by combining at least two divalent linking groups selected from the group consisting of them, more preferably an alkylene group, —NH—, —O—, or a group formed by combining at least two divalent linking groups selected from the group consisting of them, and most preferably —NH—, —O—, or —NH(CH$_2$)$_r$—O— (wherein r represents an integer of 1 to 8 and is most preferably 3).

Next, the compound represented by formula (II) is described. In formula (II), the substituent represented by R has the same meaning as the substituent represented by $R^1$, $R^2$ and $R^3$ in formula (I), and its preferred range is also the same. m preferably represents an integer of 1 to 3, more preferably 2 or 3.

Among the compounds represented by formula (II), the compound represented by the following formula (IIa) is preferred.

Formula (IIa):

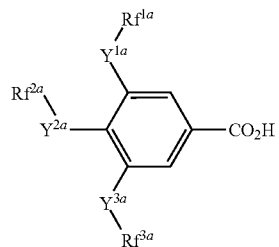

wherein each of $Rf^{1a}$, $Rf^{2a}$ and $Rf^{3a}$ independently represents an alkyl group having a $CF_3$ group or a $CF_2H$ group at the terminal, and each of $Y^{1a}$, $Y^{2a}$ and $Y^{3a}$ independently represents an alkylene group, —CO—, —NH—, —O—, —S—, —SO$_2$—, or a group formed by combining at least two divalent linking groups elected from the group consisting of them.

The alkyl group having a CF₃ group or a CF₂H group at the terminal represented by $Rf^{1a}$, $Rf^{2a}$ and $Rf^{3a}$ has the same meaning as the alkyl group having a CF₃ group or a CF₂H group at the terminal represented by $Rf^1$, $Rf^2$ and $Rf^3$ in formula (Ib), and its preferred range is also the same. $Y^{1a}$, $Y^{2a}$ and $Y^{3a}$ have the same meanings as $Y^1$, $Y^2$ and $Y^3$ in formula (Ib), and their preferred ranges are also the same. Each of $Y^{1a}$, $Y^{2a}$ and $Y^{3a}$ is most preferably an alkylene group, —O—, or a group formed by combining at least two divalent linking groups elected from the group consisting of them.

Finally, the compound represented by formula (III) is described. The substituent represented by each of $R^4$, $R^5$, $R^6$, $R^7$, $R^8$ and $R^9$ has the same meaning as the substituent represented by $R^1$, $R^2$ and $R^3$ in formula (I), and its preferred range is also the same.

Among the compounds represented by formula (III), the compound represented by the following formula (IIIa) is preferred.

Formula (IIIa):

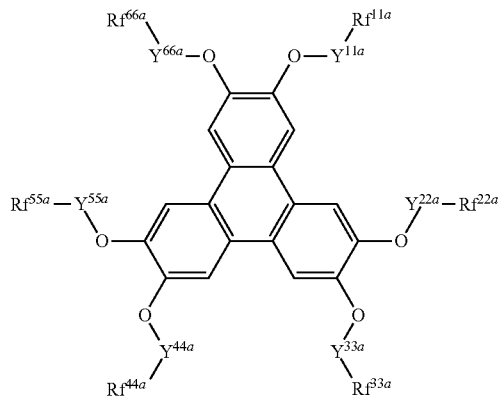

wherein each of $Rf^{11a}$, $Rf^{22a}$, $Rf^{33a}$, $Rf^{44a}$, $Rf^{55a}$ and $Rf^{66a}$ independently represents an alkyl group having a CF₃ group or a CF₂H group at the terminal, and each of $Y^{11a}$, $Y^{22a}$, $Y^{33a}$, $Y^{44a}$, $Y^{55a}$ and $Y^{66a}$ independently represents an alkylene group, —CO—, —NH—, —O—, —S—, —SO₂—, or a group formed by combining at least two divalent linking groups elected from the group consisting of them.

The alkyl group having a CF₃ group or a CF₂H group at the terminal represented by each of $Rf^{11a}$, $Rf^{22a}$, $Rf^{33a}$, $Rf^{44a}$, $Rf^{55a}$ and $Rf^{66a}$ has the same meaning as the alkyl group having a CF₃ group or a CF₂H group at the terminal represented by $Rf^1$, $Rf^2$ and $Rf^3$ in formula (Ib), and its preferred range is also the same. $Y^{11a}$, $Y^{22a}$, $Y^{33a}$, $Y^{44a}$, $Y^{55a}$ and $Y^{66a}$ have the same meanings as $Y^1$, $Y^2$ and $Y^3$ in formula (Ib), and their preferred ranges are also the same. Each of $Y^{11a}$, $Y^{22a}$, $Y^{33a}$, $Y^{44a}$, $Y^{55a}$ and $Y^{66a}$ is most preferably an alkylene group, —O—, or a group formed by combining at least two divalent linking groups elected from the group consisting of them.

Specific examples of the compounds represented by formulae (I), (II) and (III) are illustrated below, but the compound for use in the present invention is not limited thereto. In specific examples below, Nos. I-1 to I-39 are examples of the compound represented by formula (I); Nos. I-40 to I-50 are examples of the compound represented by formula (II), and Nos. I-51 to I-59 are examples of the compound represented by formula (III).

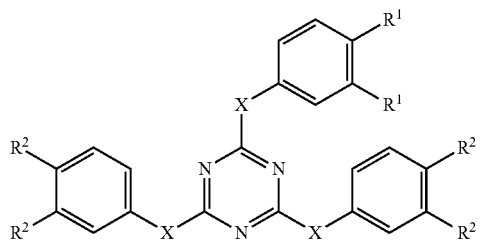

| Compound No. | $R^1$ | $R^2$ | X |
|---|---|---|---|
| I-1 | O(CH₂)₃(CF₂)₄F | O(CH₂)₃(CF₂)₄F | NH |
| I-2 | O(CH₂)₃(CF₂)₆F | O(CH₂)₃(CF₂)₆F | NH |
| I-3 | O(CH₂)₃(CF₂)₈F | O(CH₂)₃(CF₂)₈F | NH |
| I-4 | OCH₂(CF₂)₆F | OCH₂(CF₂)₆F | NH |
| I-5 | OCH₂(CF₂)₈F | OCH₂(CF₂)₈F | NH |
| I-6 | O(CH₂)₃O(CH₂)₂(CF₂)₈F | O(CH₂)₃O(CH₂)₂(CF₂)₈F | NH |
| I-7 | O(CH₂)₃O(CH₂)₂(CF₂)₄F | O(CH₂)₃O(CH₂)₂(CF₂)₄F | NH |
| I-8 | O(CH₂)₃S(CH₂)₂(CF₂)₆F | O(CH₂)₃S(CH₂)₂(CF₂)₆F | NH |
| I-9 | O(CH₂)₃S(CH₂)₂(CF₂)₄F | O(CH₂)₃S(CH₂)₂(CF₂)₄F | NH |
| I-10 | O(CH₂)₆S(CH₂)₂(CF₂)₆F | O(CH₂)₆S(CH₂)₂(CF₂)₆F | NH |
| I-11 | O(CH₂)₆S(CH₂)₂(CF₂)₄F | O(CH₂)₆S(CH₂)₂(CF₂)₄F | NH |
| I-12 | OC₁₈H₈₁ | OC₁₈H₈₁ | NH |
| I-13 | OC₁₂H₂₅ | OC₁₂H₂₅ | NH |
| I-14 | OC₈H₁₇ | OC₁₂H₂₅ | NH |
| I-15 | OC₁₆H₃₅ | OC₁₂H₂₅ | NH |
| I-16 | OC₁₃H25 | OC₁₅H₃₃ | NH |
| I-17 | O(CH₂)₃O(CH₂)(CF₂)₆F | O(CH₂)₃O(CH₂)(CF₂)₆F | O |
| I-18 | O(CH₂)₃(CF₂)₈F | O(CH₂)₃(CF₂)₈F | O |
| I-19 | OCH₂(CF₂)₈H | OCH₂(CF₂)₈H | O |
| I-20 | O(CH₂)₂O(CH₂)₂(CF₂)₆F | O(CH₂)₂O(CH₂)₂(CF₂)₆F | O |
| I-21 | O(CH₂)₃S(CH₂)₂(CF₂)₆F | O(CH₂)₃S(CH₂)₂(CF₂)₆F | O |
| I-22 | O(CH₂)₂O(CH₂)(CF₂)₆H | O(CH₂)₂O(CH₂)(CF₂)₆H | O |
| I-23 | O(CH₂)₃(CF₂)₅F | O(CH₂)₃(CF₂)₆F | S |
| I-24 | OCH₂(CF₂)₆H | OCH₂(CF₂)₆H | S |
| I-25 | O(CH₂)₂O(CH₂)₂(CF₂)₆F | O(CH₂)₂O(CH₂)₂(CF₂)₆F | S |
| I-26 | O(CH₂)₃S(CH₂)₂(CF₂)₆F | O(CH₂)₃S(CH₂)₂(CF₂)₆F | S |
| I-27 | O(CH₂)₂S(CH₂)(CF₂)₆H | O(CH₂)₂S(CH₂)(CF₂)₆H | S |

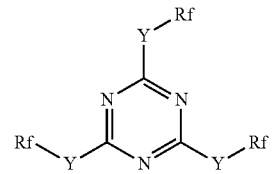

| Compound No. | $R^f$ | Y |
|---|---|---|
| I-28 | (CH₂)₂(CF₂)₄F | O |
| I-29 | (CH₂)₂(CF₂)₆F | O |
| I-30 | (CH₂)₂(CF₂)₈F | O |
| I-31 | CH₂(CF₂)₆H | O |
| I-32 | CH₂(CF₂)₈H | O |
| I-33 | (CH₂)₂(CF₂)₆F | O(CF₂)₂O |
| I-34 | (CH₂)₂(CF₂)₄F | O(CF₂)₂O |
| I-35 | (CH₂)₂(CF₂)₆F | O(CF₂)₃S |
| I-36 | (CH₂)₂(CF₂)₈F | O(CF₂)₆S |
| I-37 | (CH₂)₂(CF₂)₆F | NH(CH₂)₆S |
| I-38 | CH₂(CF₂)₆H | NH(CH₂)₃O |
| I-39 | CH₂(CF₂)₈H | NH(CH₂)₃O |

In the Table, Y is connected to the triazine ring at the left side and connected to Rf at the right side.

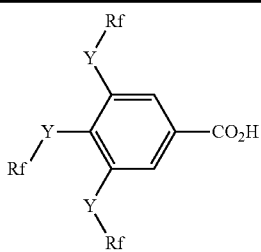

| Compound No. | Rf | Y |
|---|---|---|
| I-40 | $(CH_2)_3(CF_2)_4F$ | O |
| I-41 | $(CH_2)_3(CF_2)_6F$ | O |
| I-42 | $(CH_2)_3(CF_2)_8F$ | O |
| I-43 | $CH_2(CF_2)_8H$ | O |
| I-44 | $CH_2(CF_2)_{14}H$ | O |
| I-45 | $(CH_2)_3(CF_2)_6F$ | $O(CH_2)_2O$ |
| I-46 | $(CH_2)_3(CF_2)_4F$ | $O(CH_2)_3O$ |
| I-47 | $(CH_2)_3(CF_2)_6F$ | $O(CH_2)_3S$ |
| I-48 | $(CH_2)_3(CF_2)_6F$ | $O(CH_2)_6S$ |

In the Table, Y is connected to the benzene ring at the left side and connected to Rf at the right side.

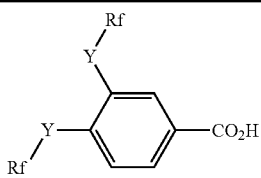

| Compound No. | Rf | Y |
|---|---|---|
| I-49 | $(CH_2)_3(CF_2)_6F$ | O |
| I-50 | $(CH_2)_3(CF_2)_6F$ | $O(CH_2)_2O$ |

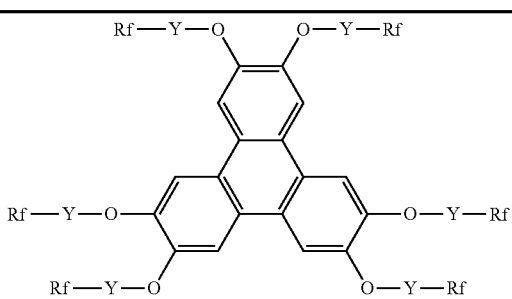

| Compound No. | Rf | Y |
|---|---|---|
| I-51 | $(CF_2)_4F$ | $(CH_2)_3$ |
| I-52 | $(CF_2)_6F$ | $(CH_2)_3$ |
| I-53 | $(CF_2)_8F$ | $(CH_2)_3$ |
| I-54 | $(CF_2)_6H$ | $CH_3$ |
| I-55 | $(CF_2)_8H$ | $CH_3$ |
| I-56 | $(CH_2)_2(CF_2)_6F$ | $(CH_2)_2O$ |
| I-57 | $(CH_2)_2(CF_2)_4F$ | $(CH_2)_2O$ |
| I-58 | $(CH_2)_2(CF_2)_6F$ | $(CH_2)_2S$ |
| I-59 | $(CH_2)_2(CF_2)_6F$ | $(CH_2)_6S$ |

In the Table, Y is connected to the oxygen atom at the left side and connected to Rf at the right side.

In the present invention, the amount added of the compound represented by formulae (I) to (III) is preferably from 0.01 to 20 mass %, more preferably from 0.05 to 10 mass %, still more preferably from 0.1 to 5 mass %, based on the amount of the discotic liquid crystalline compound. As for the compounds represented by formulae (I) to (III), one compound may be used alone, or two or more compounds may be used in combination.

[Fixing of Aligned State of Liquid Crystalline Compound]

In the case of forming one optically anisotropic layer or two or more optically anisotropic layers from a liquid crystalline compound, the aligned liquid crystalline compound is preferably fixed while maintaining the aligned state. The fixing is preferably effected by a polymerization reaction of a polymerizable group introduced into the liquid crystalline compound. The polymerization reaction includes a thermal polymerization reaction using a thermal polymerization initiator and a photopolymerization reaction using a photopolymerization initiator. A photopolymerization reaction is preferred. Examples of the photopolymerization initiator which can be employed include an α-carbonyl compound (those described in U.S. Pat. Nos. 2,367,661 and 2,367,670), an acyloin ether (those described in U.S. Pat. No. 2,448,828), an α-hydrocarbon-substituted aromatic acyloin compound (those described in U.S. Pat. No. 2,722,512), a polynuclear quinone compound (those described in U.S. Pat. Nos. 3,046,127 and 2,951,758), a combination of triarylimidazole dimer and p-aminophenyl ketone (those described in U.S. Pat. No. 3,549,367), an acridine or phenazine compound (those described in JP-A-60-105667 and U.S. Pat. No. 4,239,850), and an oxadiazole compound (those described in U.S. Pat. No. 4,212,970).

The amount of the photopolymerization initiator used is preferably from 0.01 to 20 mass %, more preferably from 0.5 to 5 mass %, based on the solid content of the coating solution. The light irradiation for polymerizing the liquid crystalline molecule preferably uses an ultraviolet ray. The irradiation energy is preferably from 20 mJ/cm² to 50 J/cm², more preferably from 100 to 800 mJ/cm². In order to accelerate the photopolymerization reaction, the light irradiation may be performed under heating conditions. The thickness of the optically anisotropic layer is preferably from 0.1 to 10 μm, more preferably from 0.5 to 5 μm.

The optically anisotropic layer is preferably formed by coating a coating solution containing the liquid crystalline compound, the polymerization initiator above and other additives on an orientation film. As the solvent for use in the preparation of the coating solution, an organic solvent is preferably used. Examples of the organic solvent include an amide (e.g., N,N-dimethylformamide), a sulfoxide (e.g., dimethyl sulfoxide), a heterocyclic compound (e.g., pyridine), a hydrocarbon (e.g., benzene, hexane), an alkyl halide (e.g., chloroform, dichloromethane), an ester (e.g., methyl acetate, butyl acetate), a ketone (e.g., acetone, methyl ethyl ketone), and an ether (e.g., tetrahydrofuran, 1,2-dimethoxyethane). Among these, an alkyl halide and a ketone are preferred. Two or more kinds of organic solvents may be used in combination. For the coating of the coating solution, known methods (for example, an extrusion coating method, a direct gravure coating method, a reverse gravure coating method, and a die coating method) can be widely employed.

[Orientation Film]

An orientation film is preferably used for aligning the liquid crystalline compound. An orientation film which exerts an aligning function when imparted with an electric field or magnetic field or irradiated with light is also known. The kind of the polymer used for the orientation film can be determined according to the alignment (particularly, the average tilt angle) of the liquid crystalline compound. For example, in order to horizontally align the liquid crystalline compound, a polymer causing no reduction in the surface energy of the orientation film (polymer for normal alignment) is used. As for the specific kind of the polymer, the matters described in known publications on the liquid crystal cell or optically compensatory sheet can be widely employed. Particularly, in the case of aligning the liquid crystalline compound in the direction orthogonal to the rubbing treatment direction, for example, a modified polyvinyl alcohol described in JP-A-2002-62427, an acrylic acid-based copolymer described in JP-A-2002-98836, a polyimide described in JP-A-2002-268068, and a polyamic acid may be preferably used. In any orientation film, the polymer preferably has a polymerizable group for the purpose of more improving the adherence of the liquid crystalline compound to the transparent support. The polymerizable group may be introduced by a repeating unit having a polymerizable group in the side chain or as a substituent of a cyclic group. An orientation film capable of forming a chemical bond with the liquid crystalline compound at the interface is more preferably used, and as this orientation film, those described, for example, in JP-A-9-152509 may be employed.

The thickness of the orientation film is preferably from 0.01 to 5 µm, more preferably from 0.05 to 2 µm. Incidentally, it is also possible that after aligning the liquid crystalline compound by using an orientation film, the liquid crystalline compound is fixed while keeping the aligned state to form an optically anisotropic layer and only the optically anisotropic layer is transferred on a polymer film (or a transparent support).

<In Case of Producing Optically Anisotropic Layer B by Using Cellulose Acylate Film>
(Cellulose Acylate Resin)

The cellulose acylate resin for use in the present invention is not particularly specified. The cellulose as the raw material of the acylate includes, for example, cotton linter and wood pulp (hardwood pulp, softwood pulp). A cellulose acylate obtained from any raw material cellulose may be used and depending on the case, a mixture thereof may be used. These raw material celluloses are described in detail, for example, in Marusawa and Uda, *Plastic Zairyo Koza* (17), *Seniso-kei Jushi* (*Lecture on Plastic Material* (17), *Cellulose-Based Resin*), Nikkan Kogyo Shinbun Sha (1970), and *JIII Journal of Technical Disclosure*, No. 2001-1745, pp. 7-8, and celluloses described therein can be used.

The cellulose acylate that is preferably used in the present invention is described in detail below. The β-1,4-bonded glucose unit constituting cellulose has a free hydroxyl group at the 2-position, 3-position and 6-position. The cellulose acylate is a polymer where these hydroxyl groups are partially or entirely esterified with an acyl group having a carbon number of 2 or more. The acyl substitution degree means a ratio in which the cellulose hydroxyl group at the 2-position, 3-position and 6-position is esterified (100% esterification corresponds to a substitution degree of 1).

The total acyl substitution degree, that is, DS2+DS3+DS6, is preferably from 1.5 to 2.95, more preferably from 1.8 to 2.90, and from the standpoint of developing the optical characteristics, the total acyl substitution degree of the cellulose acylate contained in at least one layer is still more preferably from 1.9 to 2.85.

In acylating the cellulose, when an acid anhydride or an acid chloride is used as the acylating agent, an organic acid such as acetic acid and methylene chloride is used as the organic solvent that is the reaction solvent As the catalyst, a protonic catalyst such as sulfuric acid is preferably used when the acylating agent is an acid anhydride, and a basic compound is used when the acylating agent is an acid chloride (for example, $CH_3CH_2COCl$).

A most general industrial method for synthesizing a mixed fatty acid ester of cellulose is a method of acylating cellulose with a mixed organic acid component containing fatty acids (for example, acetic acid, propionic acid, and butyric acid) corresponding to an acetyl group and other acyl groups, or an acid anhydride thereof.

The cellulose acylate for use in the present invention can be synthesized by the method described, for example, in JP-A-10-45804.

<Additive>

In the film of the present invention, additives such as inorganic fine particle (matting agent); a non-phosphoric acid ester-based compound; a retardation adjusting agent (retardation developer and retardation decreasing agent); a plasticizer such as phthalic acid ester and phosphoric acid ester-based compound; an ultraviolet absorber; and an antioxidant may be also added as an additive.

As for the solvent used, preferred examples of the lower alcohols include methyl alcohol, ethyl alcohol, propyl alcohol, isopropyl alcohol and butyl alcohol. The solvent other than the lower alcohol is not particularly limited, but it is preferred to use a solvent used at the film formation of a cellulose ester.

(Non-Phosphoric Acid-Based Compound)

The film of the present invention preferably contains a phosphoric acid ester-based compound or a polyester-based compound of a non-phosphoric acid ester type. The additives which can be used in the film of the present invention are described in detail below.

The film of the present invention preferably contains a non-phosphoric acid ester-type compound in the low substitution degree layer. Such a non-phosphoric acid ester-based compound when contained produces and effect that the film of the present invention is less likely to be whitened.

The term "non-phosphoric acid ester-based compound" as used in the description of the present invention refers to a "compound having an ester bond, which is a compound where the acid contributing to the ester bond is an acid other than phosphoric acid", that is, the "non-phosphoric acid ester-based compound" means a compound which does not contain a phosphoric acid and is of an ester type".

The non-phosphoric acid ester-based compound may be a low molecular compound or a polymer (high molecular compound). Hereinafter, the non-phosphoric acid ester-based compound that is a polymer (high molecular compound) is sometimes referred to as a non-phosphoric acid ester-based polymer.

As the non-phosphoric acid ester-based compound, high-molecular-weight additives and low-molecular-weight additives known as the additive for a cellulose acylate film may be widely employed. The content of the additive is preferably from 1 to 35 mass %, more preferably from 4 to 30 mass %, still more preferably from 10 to 25 mass %, based on the cellulose-based resin.

The high-molecular-weight additive used as the non-phosphoric acid ester-based compound in the film of the present invention has a repeating unit in the compound and is preferably a compound having a number average molecular weight of 700 to 10,000. The high-molecular-weight additive has a function of increasing the volatilization rate of the solvent in the solution casting method and also has a function of reducing the residual solvent amount. Furthermore, this compound exhibits a useful effect from the standpoint of improving the film quality, for example, enhancing the mechanical property, providing flexibility, imparting resistance to water absorption, or decreasing water permeability.

The number average molecular weight of the high-molecular-weight additive that is the non-phosphoric acid ester-based compound in the present invention is more preferably from 700 to 8,000, still more preferably from 700 to 5,000, yet still more preferably from 1,000 to 5,000.

The high-molecular-weight additive that is the non-phosphoric acid ester-based compound for use in the present invention is described in detail below by referring to its specific examples, but needless to say, the high-molecular-weight additive that is the non-phosphoric acid ester-based compound for use in the present invention is not limited thereto.

Examples of the high-molecular-weight additive that is a non-phosphoric acid ester-based compound include a polyester-based polymer (e.g., aliphatic polyester-based polymer, aromatic polyester-based polymer), and a copolymer of a polyester-based component and other components. An aliphatic polyester-based polymer, an aromatic polyester-based polymer, a copolymer of a polyester-based polymer (e.g., aliphatic polyester-based polymer, aromatic polyester-based polymer) and an acrylic polymer, and a copolymer of a polyester-based polymer (e.g., aliphatic polyester-based polymer, aromatic polyester-based polymer) and a styrene-based polymer are preferred, and a polyester compound containing an aromatic ring as at least one copolymerization component.

The aliphatic polyester-based polymer is obtained by a reaction of an aliphatic dicarboxylic acid having a carbon number of 2 to 20 with at least one kind of a diol selected from an aliphatic diol having a carbon number of 2 to 12 and an alkyl ether diol having a carbon number of 4 to 20, and the both terminals of the reaction product may be kept as intact as in the reaction product, or so-called terminal blocking may be performed by further reacting the reaction product with monocarboxylic acids, monoalcohols or phenols. In view of storability and the liked, it is effective to perform the terminal blocking so as not to contain free carboxylic acids. The dicarboxylic acid used in the polyester-based polymer of the present invention is preferably an aliphatic dicarboxylic acid residue having a carbon number of 4 to 20 or an aromatic dicarboxylic acid residue having a carbon number of 8 to 20.

Examples of the aliphatic dicarboxylic acid having a carbon number of 2 to 20 which is preferably used in the present invention include oxalic acid, malonic acid, succinic acid, maleic acid, fumaric acid, glutaric acid, adipic acid, pimelic acid, suberic acid, azelaic acid, sebacic acid, dodecanedicarboxylic acid, and 1,4-cyclohexanedicarboxylic acid.

Among these, preferred aliphatic dicarboxylic acids are malonic acid, succinic acid, maleic acid, fumaric acid, glutaric acid, adipic acid, azelaic acid, and 1,4-cyclohexanedicarboxylic acid, and more preferred aliphatic dicarboxylic acids are succinic acid, glutaric acid and adipic acid.

The diol utilized for the high-molecular-weight additive is, for example, a diol selected from an aliphatic diol having a carbon number of 2 to 20 and an alkyl ether diol having a carbon number of 4 to 20.

The aliphatic diol having a carbon number of 2 to 20 includes an alkyl diol and alicyclic diols, and examples thereof include ethanediol, 1,2-propanediol, 1,3-propanediol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3-propanediol (3,3-dimethylolheptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol, and 1,12-octadecanediol. One of these glycols may be used, or two or more thereof may be used as a mixture.

Preferred aliphatic diols are ethanediol, 1,2-propanediol, 1,3-propanediol, 1,2-butanediol, 1,3-butanediol, 2-methyl-1,3-propanediol, 1,4-butanediol, 1,5-pentanediol, 3-methyl-1,5-pentanediol, 1,6-hexanediol, 1,4-cyclohexanediol and 1,4-cyclohexanedimethanol, and more preferred are ethanediol, 1,2-propanediol, 1,3-propanediol, 1,2-butanediol, 1,3-butanediol, 1,4-butanediol, 1,5-pentanediol, 1,6-hexanediol, 1,4-cyclohexanediol and 1,4-cyclohexanedimethanol.

The alkyl ether diol having a carbon number of 4 to 20 is preferably polytetramethylene ether glycol, polyethylene ether glycol, polypropylene ether glycol, or a combination thereof. The average degree of polymerization thereof is not particularly limited but is preferably from 2 to 20, more preferably 2 to 10, still more preferably from 2 to 5, yet still more preferably from 2 to 4. As for examples thereof, examples of the typically useful commercially-available polyether glycols include Carbowax resin, Pluronics resin and Niax resin.

In the present invention, a high-molecular-weight additive with terminals being capped with an alkyl group or an aromatic group is preferred, because protection of the terminal with a hydrophobic functional group is effective against aging deterioration and plays the role of retarding the hydrolysis of an ester group.

In order to keep both terminals of the polyester additive of the present invention from becoming a carboxylic acid or an OH group, the terminals are preferably protected with a monoalcohol residue or a monocarboxylic acid residue.

In this case, the monoalcohol is preferably a substituted or unsubstituted monoalcohol having a carbon number of 1 to 30, and examples thereof include an aliphatic alcohol such as methanol, ethanol, propanol, isopropanol, butanol, isobutanol, pentanol, isopentanol, hexanol, isohexanol, cyclohexyl alcohol, octanol, isooctanol, 2-ethylhexyl alcohol, nonyl alcohol, isononyl alcohol, tert-nonyl alcohol, decanol, dodecanol, dodecahexanol, dodecaoctanol, allyl alcohol and oleyl alcohol, and a substituted alcohol such as benzyl alcohol, 3-phenylpropanol.

The alcohol used for terminal blocking is preferably methanol, ethanol, propanol, isopropanol, butanol, isobutanol, isopentanol, hexanol, isohexanol, cyclohexyl alcohol, isooctanol, 2-ethylhexyl alcohol, isononyl alcohol, oleyl alcohol or benzyl alcohol, more preferably methanol, ethanol, propanol, isobutanol, cyclohexyl alcohol, 2-ethylhexyl alcohol, isononyl alcohol or benzyl alcohol.

In the case of blocking with a monocarboxylic acid residue, the monocarboxylic acid used as the monocarboxylic acid residue is preferably a substituted or unsubstituted monocarboxylic acid having a carbon number of 1 to 30. This may be either an aliphatic monocarboxylic acid or an aromatic ring-containing carboxylic acid, and preferred aliphatic monocarboxylic acids include acetic acid, propionic acid, butanoic acid, caprylic acid, caproic acid, decanoic acid, dodecanoic acid, stearic acid and oleic acid. Examples of the aromatic ring-containing monocarboxylic acid include benzoic acid, p-tert-butylbenzoic acid, p-tert-amylbenzoic acid, o-toluic acid, p-toluic acid, dimethylbenzoic acid, ethylbenzoic acid, n-propylbenzoic acid, aminobenzoic acid, and acetoxybenzoic acid. One of these or two or more thereof may be used.

The high-molecular-weight additive may be also easily synthesized in usual manner by either a thermal melt condensation method of performing a polyesterification or transesterification reaction of the aliphatic dicarboxylic acid and the diol and/or the monocarboxylic acid or monoalcohol for terminal blocking, or an interfacial condensation method of an acid chloride of the acid above and glycols. The polyester-based additive is described in detail in Koichi Murai (compiler), *Tenkazai, Sono Riron to Oyo* (*Additives, Its Theory and Application*), Saiwai Shobo, first original edition (Mar. 1, 1973). Also, the materials described in JP-A-05-155809, JP-A-05-155810, JP-A-5-197073, JP-A-2006-259494, JP-A-07-330670, JP-A-2006-342227, and JP-A-2007-003679 may be utilized.

The aromatic polyester-based polymer is obtained by copolymerizing the polyester polymer with a monomer having an aromatic ring. The monomer having an aromatic ring is at least one or more kinds of monomers selected from an aromatic dicarboxylic acid having a carbon number of 8 to 20 and an aromatic diol having a carbon number of 6 to 20.

Examples of the aromatic dicarboxylic acid having a carbon number of 8 to 20 include phthalic acid, terephthalic acid, isophthalic acid, 1,5-naphthalene dicarboxylic acid, 1,4-naphthalene dicarboxylic acid, 1,8-naphthalene dicarboxylic acid, 2,8-naphthalene dicarboxylic acid and 2,6-naphthalene dicarboxylic acid. Among these, preferred aromatic dicarboxylic acids are phthalic acid, terephthalic acid and isophthalic acid.

Examples of the aromatic diol having a carbon number of 6 to 20 include, but are not limited to, bisphenol A, 1,2-hydroxy benzene, 1,3-hydroxy benzene, 1,4-hydroxy benzene and 1,4-benzene dimethanol, and bisphenol A, 1,4-hydroxy benzene and 1,4-benzene dimethanol are preferred.

In the present invention, the aromatic polyester-based polymer is used by combining the polyester above with at least one kind of an aromatic dicarboxylic acid or at least one kind of an aromatic diol, and the combination thereof is not particularly limited. There is no problem even when for each component, several kinds of components are combined. In the present invention, as described above, a high-molecular-weight additive in which the terminals are blocked with an alkyl group or an aromatic group is particularly preferred, and the above-described method can be used for blocking.

(Plasticizer)

As the plasticizer for use in the present invention, many compounds known as the plasticizer for a cellulose acylate may be also usefully used. A phosphoric acid ester-based compound or a carboxylic acid ester is used as the plasticizer. Examples of the phosphoric acid ester-based compound include triphenyl phosphate (TPP) and tricresyl phosphate (TCP). The carboxylic acid ester is typically a phthalic acid ester or a citric acid ester. Examples of the phthalic acid ester include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citric acid ester include triethyl O-acetylcitrate (OACTE) and tributyl O-acetylcitrate (OACTB). Other examples of the carboxylic acid ester include butyl oleate, methylacetyl ricinoleate, dibutyl sebacate, and various trimellitic acid esters. A phthalic acid ester-based plasticizer (DMP, DEP, DBP, DOP, DPP, DEHP) is preferably used, and DEP and DPP are more preferred.

(Retardation Developer)

The film or the present invention can develop retardation in the desired in-plane direction with or without containing a retardation developer but may further contain a retardation developer. By employing a retardation developer, high Re developability can be obtained with a low stretch ratio. The retardation developer is not particularly limited in its kind but includes those composed of a rod-like or discotic compound and out of the above-described non-phosphoric acid ester-based compounds, those exhibiting retardation developability. As the rod-like or discotic compound, a compound having at least two aromatic rings can be preferably used as the retardation developer.

Two or more kinds of retardation developers may be used in combination.

The retardation developer preferably has maximum absorption in the wavelength region of 250 to 400 nm and preferably has substantially no absorption in the visible region.

Examples of the retardation developer which can be used include the compounds described in JP-A-2004-50516 and JP-A-2007-86748, but the present invention is not limited thereto.

As the discotic compound, for example, the compounds described in EP-A-0911656A2, the triazine compounds described in JP-A-2003-344655, and the triphenylene compounds described in paragraphs [0097] to [0108] of JP-A-2008-150592 may be also preferably used.

The discotic compound can be synthesized by a known method, for example, the methods described in JP-A-2003-344655 and JP-A-2005-134884.

Other than the discotic compound, a rod-like compound having a linear molecular structure can be also preferably used, and the rod-like compounds described, for example, in paragraphs [0110] to [0127] of JP-A-2008-150592 may be preferably used.

Two or more kinds of rod-like compounds having a maximum absorption wavelength ($\lambda$max) longer than 250 nm in the ultraviolet absorption spectrum of the solution may be used in combination.

The rod-like compound can be synthesized by referring to the method described in publications. The publication includes *Mol. Cryst. Liq. Cryst.*, Vol. 53, page 229 (1979), ibid., Vol. 89, page 93 (1982), ibid., Vol. 145, page 111 (1987), ibid., Vol. 170, page 43 (1989), *J. Am. Chem. Soc.*, Vol. 113, page 1349 (1991), ibid., Vol. 118, page 5346 (1996), ibid., Vol. 92, page 1582 (1970), *J. Org. Chem.*, Vol. 40, page 420 (1975), and *Tetrahedron*, Vol. 48, No. 16, page 3437 (1992).

[Polarizing Plate]

The polarizing plate of the present invention is a polarizing plate having a polarizing film and two protective films for protecting both surfaces of the polarizing film, and at least either one of the protective films is preferably the optical film of the present invention.

The polarizing film includes an iodine-based polarizing film, a dye-based polarizing film using a dichroic dye, and a polyene-based polarizing film. The iodine-based polarizing film and the dye-based polarizing film can be generally produced using a polyvinyl alcohol-based film.

A configuration where the optically anisotropic layer side containing the liquid crystalline compound of the optical film is adhered to the polarizing film through an adhesive or another base material and a protective film is also provided on another side of the polarizing film, is preferred, and a configuration where the optically anisotropic layer of the optical film is adhered directly to the polarizing film with an adhesive is more preferred. In order to improve the adhesiveness between the optically anisotropic layer and the polarizing film, the surface of the optically anisotropic layer is preferably subjected to a surface treatment (e.g., glow discharge treatment, corona discharge treatment, plasma treatment, ultraviolet (UV) treatment, flame treatment, saponification treatment, solvent washing). Also, an adhesive layer (undercoating layer) may be provided on the optically anisotropic layer.

Furthermore, an adhesive layer may be provided on the surface of another protective film constituting the polarizing plate, on the side opposite the polarizing film.

By using the optical film of the present invention as a polarizing plate protective film, in addition to the expected optical characteristics, a thin polarizing plate can be produced at a low production cost.

[Liquid Crystal Display Device]

The optical film of the present invention can be applied to a liquid crystal display device. The liquid crystal display device is not particularly limited in its kind and can be used in any form of transmissive, reflective and transflective liquid crystal display devices. The liquid crystal cell used for the liquid crystal display device includes various liquid crystal cells such as twisted nematic (TN) mode, super-twisted nematic (STN) mode, horizontal alignment (ECB) mode, vertical alignment (VA) mode, in-plane switching (IPS) mode, fringe field switching (FFS) mode, bend nematic (OCB) mode, hybrid alignment (HAN) mode, ferroelectric liquid crystal (SSFLC) mode, and antiferroelctric liquid crystal (AFLC) mode liquid crystal cells. Among them, the retardation film and polarizing plate of the present invention are preferably used in combination with a VA mode, IPS mode or FFS mode liquid crystal cell, most preferably with a VA mode liquid crystal cell.

The optical film comprising a cellulose acylate film, an optically anisotropic layer A and an optically anisotropic layer B, and the optical film comprising a cellulose acylate film, an optically anisotropic layer c, an optically anisotropic layer A and an optically anisotropic layer B, described in the present invention can be also usefully used for other liquid crystal display devices and 3D displays.

[Measurement of Optical Characteristics]

In the description of the present invention, Re(λ) and Rth(λ) indicate the in-plane retardation (nm) and the retardation (nm) in the thickness direction, respectively, at a wavelength of λ. Re(λ) is measured by inputting light at a wavelength of λ nm in the film normal direction in KOBRA 21ADH or WR (manufactured by Oji Scientific Instruments).

In the case where the film measured is a film expressed by a uniaxial or biaxial refractive index ellipsoid, the Rth(λ) is calculated by the following method. The above-described Re(λ) is measured at 6 points in total by inputting light at a wavelength of λ nm from directions inclined with respect to the film normal direction in 10° steps up to 50° on one side from the normal direction by taking the in-plane slow axis (judged by KOBRA 21ADH or WR) as the inclination axis (rotation axis) (when the slow axis is not present, an arbitrary direction in the film plane is taken as the rotation axis) and based on the retardation values measured, the assumed values of average refractive index and the film thickness values input, Rth(λ) is computed by KOBRA 21ADH or WR.

In the above, when the film has a direction where the retardation value becomes zero at a certain angle inclined from the normal direction by taking the in-plane slow axis as the rotation axis, the retardation value at an inclination angle larger than that inclination angle is computed by KOBRA 21ADH or WR after converting its sign into a negative sign. Incidentally, by measuring the retardation values from two arbitrary inclined directions by taking the slow axis as the inclination axis (rotation axis) (when the slow axis is not present, an arbitrary direction in the film plane is taken as the rotation axis), Rth can be also computed based on the values obtained, the assumed values of average refractive index and the film thickness values input, according to the following formulae (11) and (12).

$$Re(\theta) = \left[ nx - \frac{ny \times nz}{\sqrt{\left\{ny \sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}}\right] \times \frac{d}{\cos\left\{\sin^{-1}\left(\frac{\sin(-\theta)}{nx}\right)\right\}}$$

Mathematical Formula (11)

$$Rth = \left[\frac{nx + ny}{2} - nz\right] \times d$$

Mathematical Formula (12)

In the formulae, Re(θ) represents the retardation value in the direction inclined at an angle of θ from the normal direction, nx represents the refractive index in the in-plane slow axis direction, ny represents the refractive index in the direction crossing with nx at right angles in the plane, nz represents the refractive index in the direction crossing with nx and ny at right angles, and d represents the thickness of the film.

In the case where the film measured is a film incapable of being expressed by a uniaxial or biaxial refractive index ellipsoid or a film lacking a so-called optic axis, Rth(λ) is calculated by the following method. The Re(λ) is measured at 11 points by inputting light at a wavelength of λ nm from directions inclined with respect to the film normal direction in 10° steps from −50° to +50° by taking the in-plane slow axis (judged by KOBRA 21ADH or WR) as the inclination axis (rotation axis), and Rth(λ) is computed by KOBRA 21ADH or WR based on the retardation values measured, the assumed values of average refractive index and the film thickness values input.

Here, as for the assumed value of average refractive index, the values described in *Polymer Handbook* (John Wiley & Sons, Inc.) and catalogues of various optical films can be used. The average refractive index of which value is unknown can be measured by an Abbe refractometer. For example, the values of average refractive index of main optical films are as follows: cellulose acylate (1.48), cycloolefin polymer (1.52), polycarbonate (1.59), polymethyl methacrylate (1.49) and polystyrene (1.59). When such an assumed value of average refractive index and the film thickness are input, nx, ny and nz can be computed by KOBRA 21ADH.

EXAMPLES

The present invention is described in greater detail below by referring to Examples, The materials, the reagents, the amounts and ratios of materials, the operations and the like described in the following Examples can be appropriately changed unless it does not deviate from the purport of the present invention. Accordingly, the scope of the present invention is not limited to the following specific examples.

[Production of First Cellulose Acylate Film]

Each of cellulose acylate films shown in the Table below was produced using each of the cellulose acylates shown in the Table below by the following method.

<Preparation 1 of Cellulose Acylate Solution>

The following raw materials were charged into a mixing tank and dissolved with stirring under heating to prepare a solution having a cellulose acylate solution.

| | |
|---|---|
| Cellulose acylate shown in Table 3 | 100 parts by mass |
| Methylene chloride (first solvent) | 402 parts by mass |
| Methanol (second solvent) | 60 parts by mass |

<Production of Cellulose Acylate Film>

562 Parts by mass of the solution having a cellulose acylate solution composition was cast using a band casting machine, and the film having a residual solvent amount of 15 mass % was subjected to fixed-end uniaxial stretching at the stretch ratio and stretching temperature shown in Table 3 to produce each of the cellulose acylate films shown in Table 3. The film was stretched in the direction orthogonal to the conveying direction.

The optical properties of the produced cellulose acylate film were measured using an automatic birefringence analyzer, KOBRA-21 ADH (manufactured by Oji Scientific Instruments), and the value at the wavelength of 548 nm was used. The low axis direction of the cellulose acylate film was confirmed. Each of A1 to A4 had a slow axis in the direction parallel to the film conveying direction, and A5 had a slow axis in the direction orthogonal to the film conveying direction.

Composition of Rod-Like Liquid Crystal Compound-Containing Coating Solution (S1):

| | |
|---|---|
| Rod-like liquid crystalline compound shown below | 1.8 g |
| Ethylene oxide-modified trimethylolpropane triacrylate (V#360, produced by Osaka Organic Chemical Industry Ltd.) | 0.2 g |
| Photopolymerization initiator (Irgacure 907, produced by Ciba-Geigy) | 0.06 g |
| Sensitizer (Kayacure DETX, produced by Nippon Kayaku Co., Ltd.) | 0.02 g |
| Methyl ethyl ketone | 3.9 g |

Rod-Like Liquid Crystalline Compound:

TABLE 3

| Cellulose Acylate Film No. | Acetyl Substitution Degree (DSB) | Benzoyl Substitution Degree (DSA) | Total Substitution Degree | Stretching Method | Stretch Ratio [%] | Stretching Temperature [° C.] | Film Thickness [μm] | Re [nm] | Rth [nm] |
|---|---|---|---|---|---|---|---|---|---|
| A1 | 1.78 | 0.85 | 2.63 | fixed-end uniaxial | 65 | 195 | 60 | 190 | −30 |
| A2 | 1.78 | 0.91 | 2.69 | fixed-end uniaxial | 30 | 206 | 78 | 150 | −65 |
| A3 | 1.78 | 0.94 | 2.72 | fixed-end uniaxial | 30 | 200 | 60 | 120 | −96 |
| A4 | 1.78 | 0.99 | 2.77 | fixed-end uniaxial | 20 | 200 | 60 | 95 | −140 |
| A5 | 2.81 | 0.00 | 2.81 | fixed-end uniaxial | 30 | 200 | 80 | 5 | 35 |

<Formation of Optically Anisotropic Layer A by Optically Anisotropic Layer Containing Rod-Like Liquid Crystal Compound>

The surface of the lengthy cellulose acetate film produced was saponified, and the coating solution for orientation film having the following composition was continuously coated thereon by a wire bar and dried with hot air at 60° C. for 60 seconds and further with hot air at 100° C. for 120 seconds to form a film. The formed film was subjected to a rubbing treatment in the clockwise direction of 45° with respect to the longitudinal direction of Cellulose Acylate Film A1 to form an orientation film.

Composition of Coating Solution for Orientation Film:

| | |
|---|---|
| Modified polyvinyl alcohol shown below | 10 parts by mass |
| Water | 371 parts by mass |
| Methanol | 119 parts by mass |
| Glutaraldehyde | 0.5 parts by mass |

Modified Polyvinyl Alcohol:

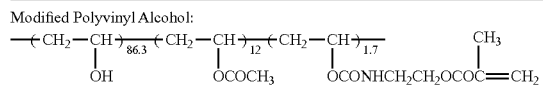

The rod-like liquid crystal compound-containing coating solution having the following composition was continuously coated on the produced orientation film by a wire bar.

-continued

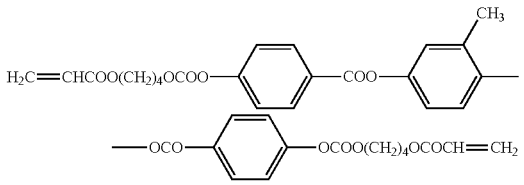

The coating was heated in a constant temperature bath at 125° C. for 3 minutes to align the rod-like liquid crystalline compound, and the rod-like liquid crystalline compound was then crosslinked through UV irradiation for 30 seconds by using a high-pressure mercury vapor lamp of 120 W/cm. By setting the temperature during UV curing to 80° C., an optically anisotropic layer was obtained. The thickness of the optically anisotropic layer was 2.0 μm. Thereafter, the film was left standing to room temperature. In this way, Optical Film 101 in which Rod-Like Liquid Crystal Layer 001 was coated on Cellulose Acylate film A1 was produced. The condition of the formed Rod-Like Liquid Crystal Layer 001 was examined and confirmed to be free from coating unevenness (unevenness produced due to repelling of the coating solution on the orientation film) or alignment disturbance. Optical characteristics of Rod-Like Liquid Crystal Layer 001 are shown in Table 4. Separately, in order to measure the optical performance of Rod-Like Liquid Crystal Layer 001 alone, on a glass substrate whose Re and Rth can be regarded as zero but not on Cellulose Acylate Film A1, Rod-Like Liquid Crystalline Layer 001 was produced by the same operation as above and measured. In these optical measurements, the value measured at a wavelength of 548 nm by using an automatic birefringence analyzer, KOBRA-21 ADH (manufactured by Oji Scientific Instruments) was used.

The slow axis direction of the rod-like liquid crystal layer was in parallel to the rubbing direction, that is, in the clockwise direction of 45° with respect to the film conveying direction.

TABLE 4

| Rod-Like Liquid Crystal Layer 001 | |
|---|---|
| Thickness/μm | 1.7 |
| Re(548)/nm | 137 |
| Rth(548)/nm | 69 |

Rod-Like Liquid Crystal Layer 002 was formed by the same method as Rod-Like Liquid Crystal Layer 001 except for changing the rubbing direction to the clockwise direction of 60° with respect to the film conveying direction. The slow axis direction of Rod-Like Liquid Crystal Layer 002 was in parallel to the rubbing direction, that is, in the clockwise direction of 60° with respect to the film conveying direction.

Rod-Like Liquid Crystal Layer 001 or 002 was formed on Cellulose Acylate Films A1 to A5 in the same manner to obtain Optical Films 001 to 007 shown in the Table 5 below.

TABLE 5

| Optical Film No. | Cellulose Acylate Film No. | Rod-Like Liquid Crystal Layer |
|---|---|---|
| Optical Film 001 | A1 | 001 |
| Optical Film 002 | A2 | 001 |
| Optical Film 003 | A3 | 001 |
| Optical Film 004 | A4 | 001 |
| Optical Film 005 | A5 | 001 |
| Optical Film 006 | A2 | None |
| Optical Film 007 | A2 | 002 |

[Production of Optically Anisotropic Layer by Discotic Liquid Crystal]
(Formation of Orientation Film)

On Optical Film 001 produced, the coating solution having the following composition was coated in an amount of 24 ml/m² by a #14 wire bar coater and dried with hot air at 60° C. for 60 seconds and further with hot air at 90° C. for 150 seconds.
Composition of Coating Solution for Orientation Film

| Modified polyvinyl alcohol shown above | 40 parts by mass |
|---|---|
| Water | 728 parts by mass |
| Methanol | 228 parts by mass |
| Glutaraldehyde | 2 parts by mass |
| Citric acid | 0.08 parts by mass |
| Citric acid monoester | 0.29 parts by mass |
| Citric acid diester | 0.27 parts by mass |
| Citric acid triethyl ester | 0.05 parts by mass |

(Formation of Optically Anisotropic Layer Composed of Discotic Liquid Crystalline Compound)

On the orientation film formed on Optical Film 001, a discotic liquid crystal-containing coating solution was continuously coated by a wire bar.
(Composition of Coating Solution for Discotic Liquid Crystal Layer)

| Discotic Compound 1 shown below | 32.6 mass % |
|---|---|
| Compound α shown below | 0.15 mass % |
| Ethylene oxide-modified trimethylolpropane triacrylate (V#360, produced by Osaka Organic Chemical Industry Ltd.) | 3.2 mass % |
| Sensitizer (Kayacure DETX, produced by Nippon Kayaku Co., Ltd.) | 0.4 mass % |
| Photopolymerization initiator (Irgacure 907, produced by Ciba-Geigy) | 1.1 mass % |
| Methyl ethyl ketone | 62.0 mass % |

Discotic Compound 1:

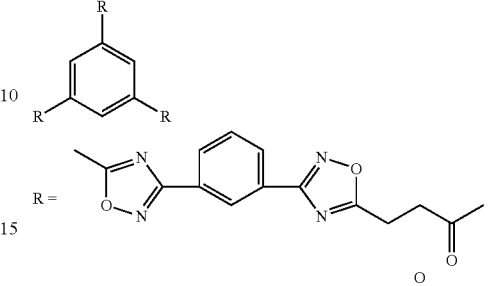

R =

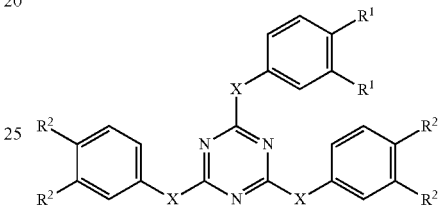

Compound α:

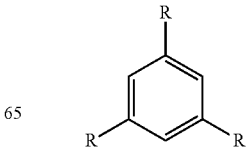

wherein R¹: $O(CH_2)_2O(CH_2)_2(CF_2)_6F$, R²: $O(CH_2)_2O(CH_2)_2(CF_2)_6F$, and X: NH.

The coating solution coated was subsequently dried under heating in a drying zone at 130° C. for 2 minutes to align the discotic compound and then irradiated with UV for 4 seconds by using a high-pressure mercury lamp of 120 W/cm at 80° C. in a UV irradiation zone to polymerize the discotic compound. Thereafter, the film was left standing to cool to room temperature and taken up, whereby a discotic liquid crystal layer was formed.

Separately, in order to measure the optical performance of the discotic liquid crystal layer alone, not on Optical Film 001 but on a glass substrate whose Re and Rth can be regarded as zero, Discotic Liquid Crystal Layer 201 was produced by the same operation as above and measured. In these optical measurements, the value measured at a wavelength of 548 nm by using an automatic birefringence analyzer, KOBRA-21 ADH (manufactured by Oji Scientific Instruments) was used. The formed discotic liquid crystal layer exhibited an optically negative refractive index anisotropy, had a thickness of 3.4 μm and developed Re=0 nm and Rth=240 nm at a wavelength of 548 nm. The discotic liquid crystalline compound of the discotic liquid crystal layer was horizontally aligned in the range of ±1°.

Discotic Liquid Crystal Compound Layers 201 to 204 were prepared by the same method except for changing the film thickness of the liquid crystal compound layer.

Discotic Liquid Crystal Compound Layers 205 to 208 were prepared in the same manner except for changing Discotic Compound 1 to Discotic Liquid Crystal Compound 2 shown below.

Discotic Compound 2:

-continued

R=

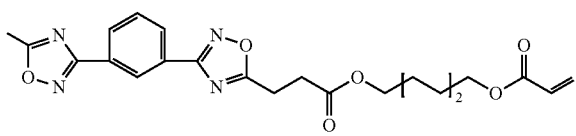

The film thickness and Re and Rth values of each of Discotic Compound Layers 201 to 208 obtained are shown in the Table 6 below. In all of the discotic liquid crystal layers, the discotic liquid crystalline compound was horizontally aligned in the range of ±1°.

TABLE 6

| Discotic Liquid Crystal Layer No. | Compound | Film Thickness [μm] | Re (548) [nm] | Rth (548) [nm] |
|---|---|---|---|---|
| Discotic Liquid Crystal Layer 201 | Discotic Compound 1 | 3.4 | 0 | 240 |
| Discotic Liquid Crystal Layer 202 | Discotic Compound 1 | 3.3 | 0 | 230 |
| Discotic Liquid Crystal Layer 203 | Discotic Compound 1 | 3.1 | 0 | 219 |
| Discotic Liquid Crystal Layer 204 | Discotic Compound 1 | 2.9 | 0 | 206 |
| Discotic Liquid Crystal Layer 205 | Discotic Compound 2 | 2.2 | 0 | 240 |
| Discotic Liquid Crystal Layer 206 | Discotic Compound 2 | 2.1 | 0 | 230 |
| Discotic Liquid Crystal Layer 207 | Discotic Compound 2 | 2.0 | 0 | 219 |
| Discotic Liquid Crystal Layer 208 | Discotic Compound 2 | 1.9 | 0 | 206 |

The discotic liquid crystal layer above was formed on Optical Films 001 to 008. The combination of the optical film and the discotic liquid crystal layer, and the combination with Optical Films 101 to 104 and 106 to 109 of the present invention and Optical Films 105 and 110 to 112 of Comparative Example are shown in the Table 7 below. Optical Films 101 to 112 were produced by coating a rod-like liquid crystal layer and a discotic compound layer on cellulose and did not pass through a lamination step.

TABLE 7

| Optical Film No. | Optical Film | Discotic Liquid Crystal Layer | |
|---|---|---|---|
| Optical Film 101 | Optical Film 001 | Discotic Compound Layer 201 | Invention |
| Optical Film 102 | Optical Film 002 | Discotic Compound Layer 202 | Invention |
| Optical Film 103 | Optical Film 003 | Discotic Compound Layer 203 | Invention |
| Optical Film 104 | Optical Film 004 | Discotic Compound Layer 204 | Invention |
| Optical Film 105 | Optical Film 005 | Discotic Compound Layer 202 | Comparative Example |
| Optical Film 106 | Optical Film 001 | Discotic Compound Layer 205 | Invention |
| Optical Film 107 | Optical Film 002 | Discotic Compound Layer 206 | Invention |
| Optical Film 108 | Optical Film 003 | Discotic Compound Layer 207 | Invention |
| Optical Film 109 | Optical Film 004 | Discotic Compound Layer 208 | Invention |

TABLE 7-continued

| Optical Film No. | Optical Film | Discotic Liquid Crystal Layer | |
|---|---|---|---|
| Optical Film 110 | Optical Film 006 | Discotic Compound Layer 202 | Comparative Example |
| Optical Film 111 | Optical Film 007 | Discotic Compound Layer 202 | Comparative Example |
| Optical Film 112 | Optical Film 002 | None | Comparative Example |

<Production of Polarizing Plate>

The surface on Cellulose Acylate Film A1 to A5 side of Optical Films 101 to 112 produced above was subjected to an alkali saponification treatment. That is, the film was dipped in an aqueous 1.5 N sodium hydroxide solution at 55° C. for 2 minutes, washed in a water washing bath at room temperature and neutralized using 0.1 N sulfuric acid at 30° C. Again, the film was washed in a water washing bath and then dried with hot air at 100° C. Separately, a rolled polyvinyl alcohol film having a thickness of 80 μm was continuously stretched at a ratio of 5 times in an aqueous iodine solution and dried to obtain a polarizing film having a thickness of 20 μm. Using each of the alkali-saponified polymer films above and preparing FUJITAC TD80UL (produced by Fujifilm Corporation) that had been subjected to the same alkali saponification treatment as above, the polarizing film was sandwiched therebetween by arranging their saponified surfaces to face the polarizing film side and laminated together using an aqueous 3% polyvinyl alcohol (PVA-117H produced by Kuraray Co., Ltd.) as an adhesive, thereby producing Polarizing Plates F1 to F12 in which each of Optical Films 101 to 112 and TD80UL were working as protective films of the polarizing film. Incidentally, each of Optical Films 101 to 112 was laminated by arranging the cellulose acylate film A1 to A5 side to come into contact with the polyvinyl alcohol. At this time, lamination was performed such that MD directions of each polymer film and TD80UL run in parallel to the absorption axis of the polarizing film.

<Production of Optically Anisotropic Layer B by Using Cellulose Acylate Film>

(Preparation of B1)

A cellulose acylate solution was prepared according to the following composition.

(Composition of Cellulose Acetate Solution)

| Cellulose acetate having an acetyl substitution degree of 2.43 | 100 parts by mass |
| Ester Oligomer 1 (shown in Table 8) | 10 parts by mass |
| Retardation Adjusting Agent 1 | 6 parts by mass |
| Methylene chloride (first solvent) | 400 parts by mass |
| Methanol (second solvent) | 59 parts by mass |

Retardation Adjusting Agent 1:

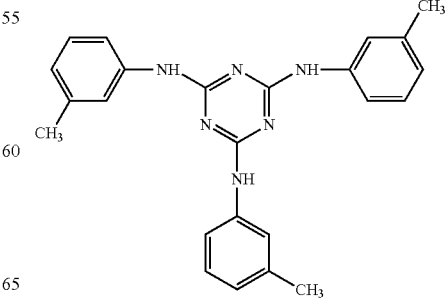

TABLE 8

|  | TPA | PA | SA | AA | EG | PG | Terminal |
|---|---|---|---|---|---|---|---|
| Ester Oligomer 1 | 55 | 0 | 45 | 0 | 50 | 50 | acetyl group |
| Ester Oligomer 2 | 45 | 5 | 30 | 20 | 100 | 0 | acetyl group |

The obtained dope was cast on a film-forming band, dried at room temperature for 1 minute and further dried at 45° C. for 5 minutes. The residual solvent amount after drying was 30 mass %. The cellulose acylate film was separated from the band, dried at 100° C. for 10 minutes and further dried at 130° C. for 20 minutes to obtain Cellulose Acylate Film B1. The film thickness was 75 μm.

In the optical measurement, the value measured at a wavelength of 548 nm by using an automatic birefringence analyzer, KOBRA-21 ADH (manufactured by Oji Scientific Instruments) was used.

In the description of the present invention, as for the values of Re(λ) and Rth(λ) such as Re(450), Re(550), Re(630), Rth(450), Rth(550) and Rth(630), measurement is performed by a measuring apparatus by using three or more different wavelengths (for example, λ=479.2, 546.3, 632.8 and 745.3 nm), and Re and Rth are calculated from respective wavelengths. These values are approximated according to the Cauchy's expression (up to the trinomial, Re=A+B/λ$^2$+C/λ$^4$) to obtain A, B and C values. Based on the obtained values, Re and Rth at the wavelength of λ are again plotted, and Re (λ) and Rth(λ) at each wavelength can be determined.

As shown in the Table below, a cellulose acylate having a predetermined acetyl substitution degree and additives were prepared, and respective components were mixed in the ratio shown in the Table below to prepare a dope.

Respective cellulose acylate solutions were prepared. Each cellulose acylate solution was cast by using a band casting machine, and the web obtained was separated from the band and dried to produce Second Cellulose Acylate Films B1 to B8 having the thickness shown in the Table 9 below.

TABLE 9

| Cellulose Ester Film | Acetyl Substitution Degree of Polymer | Additive 1 Kind | Additive 1 Amount Base on Polymer [wt %] | Additive 2 Kind | Additive 2 Amount Base on Polymer [wt %] | Film Thickness [μm] | Re [nm] | Rth [nm] | Rth(450)/Rth(550) | Rth(630)/Rth(550) |
|---|---|---|---|---|---|---|---|---|---|---|
| B1 | 2.43 | Ester Oligomer 1 | 10 | Retardation Adjusting Agent 1 | 6 | 75 | O | 220 | 1.04 | 0.99 |
| B2 | 2.43 | Ester Oligomer 1 | 10 | Retardation Adjusting Agent 2 | 6 | 75 | O | 220 | 1.04 | 0.99 |
| B3 | 2.1 | Ester Oligomer 1 | 10 | Retardation Adjusting Agent 2 | 6 | 60 | O | 220 | 1.02 | 0.99 |
| B4 | 2.81 | Ester Oligomer 2 | 7 | Retardation Adjusting Agent 1 | 9 | 90 | O | 220 | 1.06 | 0.96 |
| B5 | 2.43 | Ester Oligomer 1 | 10 | Retardation Adjusting Agent 1 | 6 | 78 | O | 240 | 1.04 | 0.99 |
| B6 | 2.43 | Ester Oligomer 1 | 10 | Retardation Adjusting Agent 1 | 6 | 75 | O | 230 | 1.04 | 0.99 |
| B7 | 2.43 | Ester Oligomer 1 | 10 | Retardation Adjusting Agent 1 | 4 | 75 | O | 200 | 1.02 | 0.99 |
| B8 | 2.1 | Ester Oligomer 1 | 10 | — | — | 75 | O | 220 | 0.96 | 1.02 |

Retardation Adjusting Agent 2:

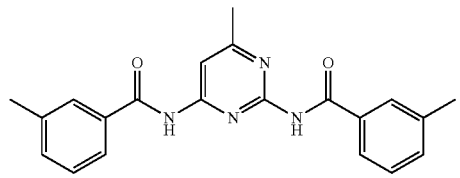

Each of Optical Films 001 to 004 and each of Cellulose Acylate Films B1 to B8 were laminated together using SK2057 (Soken Chemical & Engineering Co., Ltd.), and Optical Films 201 to 208 obtained are shown in the Table 10 below. Optical Films 201 to 208 of the present invention were prepared through one lamination step.

TABLE 10

| Optical Film | Optical Film | Cellulose Acylate Film | |
|---|---|---|---|
| Optical Film 201 | Optical Film 003 | B1 | Invention |
| Optical Film 202 | Optical Film 003 | B2 | Invention |
| Optical Film 203 | Optical Film 003 | B3 | Invention |
| Optical Film 204 | Optical Film 003 | B4 | Invention |
| Optical Film 205 | Optical Film 001 | B5 | Invention |
| Optical Film 206 | Optical Film 002 | B6 | Invention |
| Optical Film 207 | Optical Film 004 | B7 | Invention |
| Optical Film 208 | Optical Film 003 | B8 | Invention |

<Production of Polarizing Plate>

Polarizing Plates were produced using Optical Film 201 to Optical Film 208 and TD80UL by the same method as in the production of Polarizing Plates F1 to F12. Incidentally, Polarizing Plates F13 to F20 were produced by laminating each of Optical Films 201 to 208 such that the cellulose acylate film A1 to A5 side of the film came into contact with the polyvinyl alcohol.

<In Case of Producing Optically Anisotropic Layer A by Discotic Liquid Crystal Layer>

The surface of Cellulose Acylate Film A1 in Table 3 was subjected to a saponification treatment and then, the coating solution for orientation film having the following composition was continuously coated thereon by a wire bar and dried with hot air at 60° C. for 60 seconds and further with hot air at 100° C. for 120 seconds.

Composition of Coating Solution for Orientation Film:

| | |
|---|---|
| Modified polyvinyl alcohol shown above | 10 parts by mass |
| Water | 371 parts by mass |
| Methanol | 119 parts by mass |
| Glutaraldehyde | 0.5 parts by mass |
| Photopolymerization initiator (Irgacure 2959, produced by Ciba Japan) | 0.3 parts by mass |

(Formation of Discotic Liquid Crystal Layer Containing Discotic Liquid Crystalline Compound)

The orientation film produced above was continuously subjected to a rubbing treatment. At this time, the longitudinal direction and the conveying direction of the lengthy film were in parallel, and the rotation axis of the rubbing roller was in the counterclockwise direction of 45° with respect to the film longitudinal direction.

The discotic liquid crystal compound-containing coating solution having the following composition was continuously coated by a wire bar on the orientation film produced above. The conveying speed (V) of the film was set to 36 m/min For drying the solvent of the coating solution and ripening the alignment of the discotic liquid crystal compound, the coated film was heated with hot air at 120° C. for 90 seconds and subsequently irradiated with UV at 80° C. to fix the alignment of the liquid crystal compound, thereby forming an optically anisotropic layer having a thickness of 1.7 μm. In this way, Discotic Liquid Crystal Layer 101 was obtained.

Composition of Coating Solution for Discotic Liquid Crystal Layer:

| | |
|---|---|
| Discotic Liquid Crystal Compound 1 | 100 parts by mass |
| Photopolymerization initiator (Irgacure 907, produced by Ciba-Geigy) | 3 parts by mass |
| Sensitizer (Kayacure DETX, produced by Nippon Kayaku Co., Ltd.) | 1 part by mass |
| Pyridinium salt shown below | 1 part by mass |
| Fluorine-based polymer (FP2) shown below | 0.4 parts by mass |
| Methyl ethyl ketone | 252 parts by mass |

Pyridinium Salt:

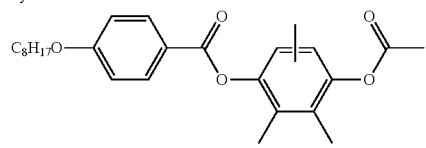

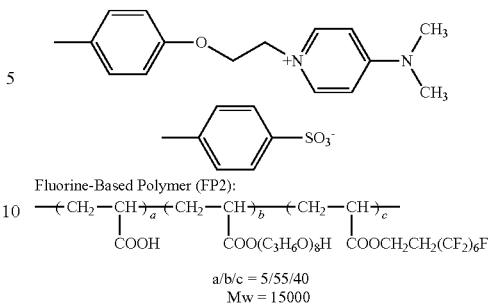

Fluorine-Based Polymer (FP2):

$-(CH_2-CH)_a-(CH_2-CH)_b-(CH_2-CH)_c-$
$\quad\quad |\quad\quad\quad\quad\quad |\quad\quad\quad\quad\quad |$
$\quad\quad COOH\quad\quad COO(C_3H_6O)_8H\quad COOCH_2CH_2(CF_2)_6F$ a/b/c = 5/55/40
Mw = 15000

Discotic Liquid Crystal Layer 101 produced above had Re of 137 nm and Rth of −30 nm at 548 nm. More specifically, the slow axis was orthogonal to the rotation axis of the rubbing roller, that is, the slow axis was in the clockwise direction of 45° with respect to the longitudinal direction of the support and the average tilt angle of the disc plane of the discotic liquid crystalline molecule was 90° with respect to the film surface. It was confirmed that the discotic liquid crystal was aligned vertically to the film surface.

Discotic Liquid Crystal Layer 101 was formed on Cellulose Acylate Film A1 to obtain Optical Film 301.

TABLE 11

| Optical Film No. | Cellulose Acylate Film | Discotic Liquid Crystal Layer |
|---|---|---|
| Optical Film 301 | A1 | Discotic Liquid Crystal Layer 101 |

The orientation film was coated on Optical Film 301 to form Discotic Liquid Crystal Layer 201, whereby Optical Film 401 was obtained. A discotic liquid crystal layer was formed by the same method as in the formation of Discotic Liquid Crystal Layer 101. Optical Film 401 of the present invention was prepared without passing through a lamination step.

TABLE 12

| Optical Film No. | Optical Film | Discotic Liquid Crystal Layer | |
|---|---|---|---|
| Optical Film 401 | Optical Film 301 | Discotic Liquid Crystal Layer 201 | Invention |

Thereafter, Optical Film 301 and Cellulose Acylate Film B5 were laminated together using SK2057 (Soken Chemical & Engineering Co., Ltd.). The thickness of SK2057 was 30 μm. Optical Film 501 of the present invention was prepared through one lamination step.

TABLE 13

| Optical Film No. | Optical Film | Cellulose Acylate Film | |
|---|---|---|---|
| Optical Film 501 | Optical Film 301 | B5 | Invention |

<Production of Polarizing Plate>

Polarizing Plates were produced using Optical Films 401 or 501 and TD80UL by the same method as in the production of Polarizing Plates F1 to F12. Incidentally, Polarizing Plates F21 and F22 were produced by laminating Optical Film 401 or 501 such that Cellulose Acylate Film A1 came into contact with the polyvinyl alcohol.

[Production of Optical Films 1101 to 1104 Containing Rod-Like Liquid Crystal Layer]
<Production of Transparent Support (Cellulose Acylate Film C1)>

The following composition was charged into a mixing tank, and respective components were dissolved with stirring under heating at 30° C. to prepare a cellulose acetate solution.

| Composition of Cellulose Acylate Solution (parts by mass) | Inner Layer | Outer Layer |
|---|---|---|
| Cellulose acetate having an acetylation degree of 60.9% | 100 | 100 |
| Triphenyl phosphate (plasticizer) | 7.8 | 7.8 |
| Biphenyl diphenyl phosphate (plasticizer) | 3.9 | 3.9 |
| Methylene chloride (first solvent) | 293 | 314 |
| Methanol (second solvent) | 71 | 76 |
| 1-Butanol (third solvent) | 1.5 | 1.6 |
| Silica fine particle (AEROSIL R972, produced by Nippon Aerosil Co., Ltd.) | 0 | 0.8 |
| Retardation Adjusting Agent 1 | 1.7 | 0 |

The obtained dope for inner layer and the dope for outer layer were cast on a drum cooled to 0° C., by using a three-layer co-casting die, and the film having a residual solvent amount of 70 mass % was separated from the drum, dried at 80° C. while conveying the film in a draw ratio of 110% in the conveying direction by fixing both ends with a pin tenter, and when the residual solvent amount became 10%, dried at 110° C. Thereafter, the film was dried at a temperature of 140° C. for 30 minutes to produce a cellulose acetate film (thickness: 80 μm (outer layer: 3 μm, inner layer: 74 μm, outer layer: 3 μm) having a residual solvent amount of 0.3 mass %. The produced cellulose acetate film had Re(548) of 5 nm and Rth(548) of 90 nm.

<Production of Transparent Support Layer (Cellulose Acylate Film C2)>
(Composition of Cellulose Acetate Solution C2)

| | |
|---|---|
| Cellulose acetate having an acetyl substitution degree of 2.43 | 100 parts by mass |
| Ester Oligomer 1 | 10 parts by mass |
| Methylene chloride (first solvent) | 400 parts by mass |
| Methanol (second solvent) | 59 parts by mass |

Cellulose Acylate Film C2 was produced by the same method as Cellulose Acylate Film B1 except for changing the cellulose acetate solution to C2. The thickness of the obtained film was 75 μm, Re(548) was 5 nm, and Rth(548) was 140 nm by Fujifilm Corporation; Cellulose Acylate Film C1, and Cellulose Acylate Film C2 were used. Re, Rth and Nz of the obtained film are shown in Table 14. The slow axis of Optical Films 1101 to 1104 was in the counterclockwise direction of 45° with respect to the film conveying direction.

TABLE 14

| | Support | Rod-Like Liquid | Optical Properties | | |
|---|---|---|---|---|---|
| | Layer | Crystal Layer | Re [nm] | Rth [nm] | Nz |
| Optical Film 1101 | ZRR 60 | Rod-Like Liquid Crystal Layer 001 | 137 | 69 | 1.0 |
| Optical Film 1102 | TD 80 UL | Rod-Like Liquid Crystal Layer 001 | 137 | 110 | 1.3 |
| Optically film 1103 | Cellulose Acylate Film C2 | Rod-Like Liquid Crystal Layer 001 | 134 | 151 | 1.6 |
| Optical Film 1104 | Cellulose Acylate Film C2 | Rod-Like Liquid Crystal Layer 001 | 137 | 206 | 2.0 |

[Production of Optical Film 1201 Containing Discotic Liquid Crystal Layer]

Discotic Liquid Crystal Layer 101 was formed on Support C1 to obtain Optical Film 1201. Re, Rth and Nz of the obtained film are shown in Table 15.

TABLE 15

| | Support | Rod-Like Liquid | Optical Properties | | |
|---|---|---|---|---|---|
| | Layer | Crystal Layer | Re [nm] | Rth [nm] | Nz |
| Optical Film 1201 | Cellulose Acylate Film C1 | Discotic Liquid Crystal Layer 101 | 137 | 69 | 1.0 |

[Production of Cycloolefin-Based Polymer]

Commercially available cycloolefin-based polymer film "ZEONOR ZF14" (produced by Zeon Corporation) was stretched under the conditions shown in Table 16 below to obtain Optical Film 1301. The film thickness, Re, Rth and Nz of Optical Film 1301 are shown in Table 16. The slow axis of the film was in parallel to the stretching direction, that is, in the counterclockwise direction of 45° with respect to the film conveying direction.

TABLE 16

| Optical Film No. | Polymer | Stretching Method | Stretching Direction | Stretch Ratio [%] | Stretching Temperature [° C.] | Film Thickness [μm] | Re [nm] | Rth [nm] | Nz |
|---|---|---|---|---|---|---|---|---|---|
| Optical Film 1301 | ZF 14 | fixed-end uniaxial | counterclockwise direction of 45° with respect to film conveying direction | 20 | 148 | 85 | 135 | 125 | 1.4 |

<Preparation of Optical Film 1101>

Rod-Like Liquid Crystal Layer 001 was formed on the support layer shown in Table 14 below to obtain Optical Films 1101 to 1104. For the support, TD80UL and ZRR60 produced <Production of Polarizing Plate>

Polarizing Plates were produced using each of Optical Films 1101 to 1104 and 1201 and TD80UL by the same method as above. Incidentally, Polarizing Plates R1 to R5 were produced by laminating each of Optical Films 1101 to 1104 and 1201 such that the support layer side came into contact with the polyvinyl alcohol.

One surface of Optical Film 1201 was subjected to a corona discharge treatment using a high frequency transmitter to obtain Film 1201-B having a surface tension of 0.055 N/m.

An acrylic adhesive was coated on both surfaces of a polarizer, and one surface of polarizing plate protective film TD80UL and the corona discharge-treated surface of Film 1201-1B were stacked to face Polarizer P and laminated together by a roll-to-roll method to obtain Polarizing Plate R6.

[Formation of Discotic Liquid Crystal Layer 101]

The surface of TD80UL was subjected to a saponification treatment, and an orientation film was formed at the same time as producing Optically Anisotropic Layer A. The orientation film was subjected to a rubbing treatment in the MD direction, that is, in the direction parallel to the film conveying direction.

A discotic liquid crystal compound-containing coating solution having the following composition was continuously coated by a wire bar on the orientation film produced above. The conveying speed (V) of the film was set to 36 m/min. For drying the solvent of the coating solution and ripening the alignment of the discotic liquid crystal compound, the coated film was heated with hot air at 80° C. for 90 seconds and subsequently irradiated with UV at 80° C. to fix the alignment of the liquid crystal compound, thereby forming an optically anisotropic layer having a thickness of 1.7 μm. In this way, Discotic Liquid Crystal Layer 001 was obtained. The thickness, Re and Rth of Discotic Liquid Crystal Layer 001 obtained are shown in the Table 17 below. The direction of the slow axis was parallel to the rotation axis of the rubbing roller, that is, parallel to the film conveying direction.

| | |
|---|---|
| Discotic Liquid Crystal Compound 1 | 100 parts by mass |
| Photopolymerization initiator (Irgacure 907, produced by Ciba-Geigy) | 3 parts by mass |
| Sensitizer (Kayacure DETX, produced by Nippon Kayaku Co., Ltd.) | 1 part by mass |
| Pyridinium salt shown above | 1 part by mass |
| Fluorine-based polymer (FP2) shown above | 0.4 parts by mass |
| Methyl ethyl ketone | 252 parts by mass |

TABLE 17

| Discotic Liquid Crystal Layer 001 | |
|---|---|
| Thickness/μm | 2.4 |
| Re (548)/nm | 190 |
| Rth (548)/nm | −50 |

Discotic Liquid Crystal Layer 001 was formed on TD80UL to obtain Optical Film 601.

TABLE 18

| Optical Film No. | Support Layer | Discotic Liquid Crystal Layer |
|---|---|---|
| Optical Film 601 | TD 80 UL | Discotic Liquid Crystal Layer 001 |

[Formation of Rod-Like Liquid Crystal Layer 001]

An orientation film was formed on Discotic Compound Layer 001 of Optical Film 601 in the same manner as above and subjected to a rubbing treatment, and Rod-Like Liquid Crystal Layer 001 was formed thereon to obtain Optical Film 701.

TABLE 19

| Optical Film No. | Optical Film No. | Rod-Like Liquid Crystal Layer |
|---|---|---|
| Optical Film 701 | Optical Film 601 | Rod-Like Liquid Crystal Layer 001 |

An orientation film was formed on Discotic Compound Layer 001 of Optical Film 601 in the same manner as in the production of Optically Anisotropic Layer A and subjected to a rubbing treatment, and Discotic Liquid Crystal Layer 101 was formed thereon to obtain Optical Film 801.

TABLE 20

| Optical Film No. | Optical Film No. | Discotic Liquid Crystal Layer |
|---|---|---|
| Optical Film 801 | Optical Film 601 | Discotic Liquid Crystal Layer 101 |

An orientation film was formed on Discotic Compound Layer 101 of Optical Film 801 in the same manner as above and subjected to a rubbing treatment, and Discotic Liquid Crystal Layer 205 was formed thereon to obtain Optical Film 901 of the present invention.

TABLE 21

| Optical Film No. | Optical Film No. | Discotic Liquid Crystal Layer | |
|---|---|---|---|
| Optical Film 901 | Optical Film 701 | Discotic Liquid Crystal Layer 205 | Invention |

An orientation film was formed on Discotic Compound Layer 101 of Optical Film 801 in the same manner as above and subjected to a rubbing treatment, and Discotic Liquid Crystal Layer 205 was formed thereon to obtain Optical Film 1001 of the present invention.

TABLE 22

| Optical Film No. | Optical Film No. | Discotic Liquid Crystal Layer | |
|---|---|---|---|
| Optical Film 1001 | Optical Film 801 | Discotic Liquid Crystal Layer 205 | Invention |

<Production of Polarizing Plate>

Polarizing Plates were produced using Optical Film 901 or 1001 and TD80UL by the same method as above. Incidentally, Polarizing Plates F23 and F24 were produced by laminating Optical Film 901 or 1001 such that the support layer side came into contact with the polyvinyl alcohol.

Comparative Example

Production of Optical Film T2

A 15 wt % cyclohexanone solution of polyimide having a weight average molecular weight of 59,000 synthesized from 2.2'-bis(3,4-dicarboxyphenyl)hexafluoropropane and 2,2'-bis(trifluoromethyl)-4,4'-diaminobiphenyl was coated on Support C1 produced above, and dried to form a polymer layer having a thickness of 4.5 μm, Re of 3.5 nm and Rth of 135 nm.

The finished film had a thickness of 92.5 μm, Re of 9.0 nm and Rth of 225 nm

<Production of Optical Film T3>

A shrinkable film, "Torayfan" BO2570A-5, trade name, produced by Toray Industries, Inc. was laminated to both sides of a 100 μm-thick polymer film containing a resin hydrogenated with a ring-opening polymer of a norbornene-based monomer ("ZEONOR ZF14-100", trade name, produced by Zeon Corporation), through an adhesive sheet, "SK2057", trade name, produced by Soken Chemical & Engineering Co., Ltd. Thereafter, the stack was stretched at 1.05 times in an air-circulating constant temperature oven at 140° C.±1° C. while holding the longitudinal direction of the film by a roll stretching machine. The obtained retardation film had a thickness of 100 μm, Re of 190 nm and Rth of −30 nm.

<Production of Optical Film 1401>

Optical Film 1301 was disposed on Optical Film T3 produced above so that the slow axis of the film could run in the clockwise direction of 45° with respect to the slow axis of a biaxial plate, and these films were laminated together through an adhesive sheet, "SK2057", trade name, produced by Soken Chemical & Engineering Co., Ltd. to produce Optical Film T4. The optical film 1301 side of Optical Film T4 and the optical film T1 side of Optical Film T2 produced above were laminated together with an adhesive sheet, "SK2057", trade name, produced by Soken Chemical & Engineering Co., Ltd. Optical Film 1401 was produced through two lamination steps and had a thickness of 320 μm.

<Production of Optical Film 1501>

Optical Film 1501 was produced in the same manner as in <Formation of Discotic Liquid Crystal Layer 101> except for changing the support to ZRR60.

TABLE 23

| Optical Film No. | Support Layer | Discotic Liquid Crystal Layer |
|---|---|---|
| Optical Film 1501 | ZRR 60 | Discotic Liquid Crystal Layer 001 |

<Production of Optical Film 1601>

Optical Film 1601 was produced in the same manner as in the production of Optically Anisotropic Layer A by an optically anisotropic layer containing a rod-like liquid crystal compound, except for changing the support to Cellulose Acylate B5.

TABLE 24

| Optical Film No. | Support Layer | Rod-Like Liquid Crystal Layer |
|---|---|---|
| Optical Film 1601 | Cellulose Acylate Film B5 | Rod-Like Liquid Crystal Layer 001 |

<Production of Optical Film 1602>

Optical Film 1602 was produced in the same manner as in the production of Optically Anisotropic Layer A by a discotic liquid crystal layer, except for changing the support to Cellulose Acylate B5.

TABLE 25

| Optical Film No. | Support Layer | Discotic Liquid Crystal Layer |
|---|---|---|
| Optical Film 1602 | Cellulose Acylate Film B5 | Discotic Liquid Crystal Layer 101 |

<Production of Optical Films 1701 and 1702>

Optical Film 1501 and Optical Film 1601 or 1602 were laminated together by using SK2057 (Soken Chemical & Engineering Co., Ltd.) to produce Optical Films 1701 and 1702. The films were laminated together so that the liquid crystal layer of 1501 and the liquid crystal layer of 1601 or 1602 could be put into contact with each other.

Optical Films 1701 and 1702 were produced through one lamination step.

TABLE 26

| Optical Film No. | Optical Film | Optical Film | |
|---|---|---|---|
| Optical Film 1701 | Optical Film 1501 | Optical Film 1601 | Invention |
| Optical Film 1702 | Optical Film 1501 | Optical Film 1602 | Invention |

A list of polarizing plates obtained above is shown in the Tables 27 and 28 below. Although the number of laminations is 2 in the optical film used for Polarizing Plate F27, the number of laminations is 1 or less in the optical film used for Polarizing Plates F1 to F24, thus facilitating the production.

Backlight-Side Polarizing Plate:

TABLE 27

| Polarizing Plate No. | Optical Film | |
|---|---|---|
| R1 | Optical Film 1101 | Invention |
| R2 | Optical Film 1102 | Invention |
| R3 | Optical Film 1103 | Invention |
| R4 | Optical Film 1104 | Invention |
| R5 | Optical Film 1201 | Invention |
| R6 | Optical Film 1301 | Invention |

Viewing-Side Polarizing Plate:

TABLE 28

| Polarizing Plate No. | Optical Film | | Number of Times of Laminating Films |
|---|---|---|---|
| F1 | Optical Film 101 | Invention | 0 |
| F2 | Optical Film 102 | Invention | 0 |
| F3 | Optical Film 103 | Invention | 0 |
| F4 | Optical Film 104 | Invention | 0 |
| F5 | Optical Film 105 | Comparative Example | 0 |
| F6 | Optical Film 106 | Invention | 0 |
| F7 | Optical Film 107 | Invention | 0 |
| F8 | Optical Film 108 | Invention | 0 |
| F9 | Optical Film 109 | Invention | 0 |
| F10 | Optical Film 110 | Comparative Example | 0 |
| F11 | Optical Film 111 | Comparative Example | 0 |
| F12 | Optical Film 112 | Comparative Example | 0 |
| F13 | Optical Film 201 | Invention | 1 |
| F14 | Optical Film 202 | Invention | 1 |
| F15 | Optical Film 203 | Invention | 1 |
| F16 | Optical Film 204 | Invention | 1 |
| F17 | Optical Film 205 | Invention | 1 |
| F18 | Optical Film 206 | Invention | 1 |
| F19 | Optical Film 207 | Invention | 1 |
| F20 | Optical Film 208 | Invention | 1 |
| F21 | Optical Film 401 | Invention | 1 |
| F22 | Optical Film 501 | Invention | 1 |
| F23 | Optical Film 901 | Invention | 0 |
| F24 | Optical Film 1001 | Invention | 0 |
| F25 | Optical Film 1701 | Invention | 1 |
| F26 | Optical Film 1702 | Invention | 1 |
| F27 | Optical Film 1401 | Comparative Example | 2 |

<Manufacturing of Liquid Crystal Display Device>

The liquid crystal cell of a VA-mode liquid crystal television, LC32DE5, manufactured by Sharp Corp. was removed, and the polarizing plate and the optical film laminated on the viewer side and the backlight side were separated.

Each of R1 to R6 in the Table 27 was laminated on the backlight side of the glass substrate of the cell above through SK2057 (produced by Soken Chemical & Engineering Co., Ltd.). At this time, the polarizing plate was disposed by arranging each of Optical Films 1101 to 1104, 1201 and 1301 on the glass substrate side.

Similarly, each of F1 to F27 in the Table 28 was laminated on the viewing side of the glass substrate of the cell above through SK2057 (produced by Soken Chemical & Engineering Co., Ltd.). At this time, the polarizing plate was disposed by arranging each of Optical Films 101 to 112, 201 to 208, 401, 501, 901, 1001, 1401, 1701 and 1702 on the glass substrate side.

The polarizing plates were disposed such that the absorption axis of the backlight-side polarizing plate and the absorption axis of the viewing-side polarizing plate were orthogonal to each other. The liquid crystal cell thus-laminated with polarizing plates was again incorporated into the liquid crystal television, LC32DE5, manufactured Sharp Corporation. In this way, Liquid Crystal Display Devices L1 to L43 of Examples and Comparative Examples were obtained.

(Unevenness on Continuous Lighting)

With respect to VA-Mode Liquid Crystal Display Devices L1 to L43 manufactured above, a backlight was provided on the backlight-side polarizer side and after continuous lighting for 24 hours, the unevenness when displayed in black was evaluated in dark room from the front direction of the liquid crystal display device. The results are shown in Table 29. It is seen that as the difference between the thickness of the optical film used for the front-side polarizing plate and the thickness of the optical film used on the backlight side is smaller, unevenness is less likely to occur.

C: Unevenness is visually recognized in an area of 30% or more of the screen.
B: Unevenness is visually recognized in an area of 10 to 30% of the screen.
A: Unevenness is visually recognized only in an area of 10% or less of the screen.

(Measurement of Contrast Ratio of Panel)

With respect to VA-Mode Liquid Crystal Display Devices L1 to L43 manufactured above, after providing a backlight on the backlight-side polarizer side, luminance was measured for black display and white display in dark room by using a measuring machine (EZ-Contrast XL88, manufactured by ELDIM), and the front contrast ratio and the contrast ratio in the direction at a polar angle of 60° and an azimuth angle of 45° (viewing-angle contrast ratio) were calculated.

As apparent from the Table 29 below, the liquid crystal display device of the present invention is a liquid crystal display device enjoying high front luminance and excellent visibility with excellent front contrast ratio and excellent viewing-angle contrast ratio, as compared with the liquid crystal display device of Comparative Examples. Incidentally, the reason why the front luminance and the front contrast ratio of Liquid Crystal Display Devices L1 to L24 and L29 to L42 of the invention are high compared with Comparative Example L43 is not clearly known but is presumed to be an effect brought about by decreasing the number of times of lamination at the production of the optical film on the viewing side and in turn, eliminating the effect of axial slippage at the film lamination.

TABLE 29

| Liquid Crystal Display Device No. | Viewing-Side Polarizing Plate No. | Backlight-Side Polarizing Plate No. | Number of Film Lamination Steps | Film Thickness of Front-Side Laminate Optical Body, [μm] | Film Thickness of Rear-Side Laminate Optical Body, [μm] | Front-Side Retardation Film-Rear-Side Retardation Film [μm] | Unevenness on Continuous Lighting | Front Luminance [cd/m²] | Front Contrast Ratio | Viewing-Angle Contrast | |
|---|---|---|---|---|---|---|---|---|---|---|---|
| L1 | F1 | R1 | 0 | 65 | 62 | 3 | A | 370 | 3000 | 100 | Example |
| L2 | F2 | R2 | 0 | 83 | 82 | 1 | A | 370 | 3000 | 100 | Example |
| L3 | F2 | R6 | 0 | 83 | 85 | −2 | A | 370 | 3000 | 100 | Example |
| L4 | F3 | R3 | 0 | 65 | 82 | −17 | A | 370 | 3000 | 100 | Example |
| L5 | F4 | R4 | 0 | 65 | 77 | −12 | A | 370 | 3000 | 100 | Example |
| L6 | F5 | R1 | 0 | 64 | 62 | 2 | A | 370 | 3000 | 100 | Example |
| L7 | F6 | R2 | 0 | 82 | 82 | 0 | A | 370 | 3000 | 100 | Example |
| L8 | F6 | R6 | 0 | 82 | 85 | −3 | A | 370 | 3000 | 100 | Example |
| L9 | F7 | R3 | 0 | 64 | 82 | −18 | A | 370 | 3000 | 100 | Example |
| L10 | F8 | R4 | 0 | 64 | 77 | −13 | A | 370 | 3000 | 100 | Example |
| L11 | F2 | R2 | 0 | 83 | 82 | 1 | A | 370 | 3000 | 70 | Example |
| L12 | F2 | R1 | 0 | 83 | 62 | 21 | A | 370 | 3000 | 70 | Example |
| L13 | F4 | R2 | 0 | 65 | 82 | −17 | A | 370 | 3000 | 70 | Example |
| L14 | F13 | R3 | 1 | 167 | 82 | 85 | B | 360 | 2500 | 100 | Example |
| L15 | F14 | R3 | 1 | 167 | 82 | 85 | B | 360 | 2500 | 100 | Example |
| L16 | F15 | R3 | 1 | 152 | 82 | 70 | B | 360 | 2500 | 100 | Example |
| L17 | F16 | R3 | 1 | 182 | 82 | 100 | B | 360 | 2500 | 100 | Example |
| L18 | F17 | R1 | 1 | 170 | 62 | 108 | B | 360 | 2500 | 100 | Example |
| L19 | F18 | R2 | 1 | 185 | 82 | 103 | B | 360 | 2500 | 100 | Example |
| L20 | F19 | R4 | 1 | 164 | 77 | 87 | B | 360 | 2500 | 100 | Example |
| L21 | F20 | R3 | 1 | 167 | 82 | 85 | B | 360 | 2500 | 100 | Example |
| L22 | F18 | R6 | 1 | 185 | 85 | 100 | B | 360 | 2500 | 100 | Example |
| L23 | F21 | R5 | 0 | 64 | 82 | −18 | A | 370 | 3000 | 100 | Example |
| L24 | F22 | R5 | 1 | 172 | 82 | 90 | B | 360 | 2500 | 100 | Example |
| L25 | F12 | R2 | 0 | 80 | 82 | −2 | A | 370 | 3000 | 10 | Comparative Example |
| L26 | F10 | R2 | 0 | 81 | 82 | 0 | — | 370 | 10 | 10 | Comparative Example |
| L27 | F11 | R2 | 0 | 83 | 82 | 1 | — | 370 | 100 | 50 | Comparative Example |
| L28 | F5 | R2 | 0 | 85 | 82 | 3 | A | 370 | 3000 | 10 | Comparative Example |

TABLE 29-continued

| Liquid Crystal Display Device No. | Viewing-Side Polarizing Plate No. | Backlight-Side Polarizing Plate No. | Number of Film Lamination Steps | Film Thickness of Front-Side Laminate Optical Body, [μm] | Film Thickness of Rear-Side Laminate Optical Body, [μm] | Front-Side Retardation Film-Rear-Side Retardation Film [μm] | Unevenness on Continuous Lighting | Front Luminance [cd/m$^2$] | Front Contrast Ratio | Viewing-Angle Contrast | |
|---|---|---|---|---|---|---|---|---|---|---|---|
| L29 | F21 | R5 | 0 | 64 | 82 | −18 | A | 370 | 3000 | 100 | Example |
| L30 | F21 | R1 | 0 | 64 | 62 | 2 | A | 370 | 3000 | 100 | Example |
| L31 | F21 | R6 | 0 | 64 | 85 | −21 | B | 370 | 3000 | 100 | Example |
| L32 | F22 | R5 | 1 | 170 | 82 | 88 | B | 360 | 3000 | 100 | Example |
| L33 | F22 | R1 | 1 | 170 | 62 | 108 | B | 360 | 3000 | 100 | Example |
| L34 | F22 | R6 | 1 | 170 | 85 | 85 | B | 360 | 3000 | 100 | Example |
| L35 | F24 | R5 | 0 | 84 | 82 | 2 | A | 370 | 3000 | 100 | Example |
| L36 | F24 | R1 | 0 | 84 | 62 | 22 | A | 370 | 3000 | 100 | Example |
| L37 | F24 | R6 | 0 | 84 | 85 | −1 | B | 370 | 3000 | 100 | Example |
| L38 | F23 | R5 | 0 | 84 | 82 | 2 | A | 370 | 3000 | 100 | Example |
| L39 | F23 | R1 | 0 | 84 | 62 | 22 | A | 370 | 3000 | 100 | Example |
| L40 | F23 | R6 | 0 | 84 | 85 | −1 | A | 370 | 3000 | 100 | Example |
| L41 | F25 | R3 | 1 | 170 | 82 | 88 | B | 360 | 3000 | 100 | Example |
| L42 | F26 | R3 | 1 | 170 | 82 | 88 | B | 360 | 3000 | 100 | Example |
| L43 | F27 | R6 | 2 | 340 | 80 | 260 | C | 340 | 1000 | 100 | Comparative Example |

The entire disclosure of each and every foreign patent application from which the benefit of foreign priority has been claimed in the present application is incorporated herein by reference, as if fully set forth.

What is claimed is:

1. An optical film comprising:
    a cellulose acylate film; and
    at least two layers of an optically anisotropic layer A and an optically anisotropic layer B,
    wherein
    the cellulose acylate film satisfies the following formulae (I) and (II),
    Re(548) of the optically anisotropic layer A is from 80 to 190 nm and the slow axis of the optically anisotropic layer A is at 45°±10° with respect to the film conveying direction, and
    the optically anisotropic layer B satisfies the following formulae (III) and (IV):

$0.1 \leq DSA \leq 2.0$  Formula (I):

$1.0 \leq DSB \leq 2.9$  Formula (II):

(wherein DSA represents the acetyl substitution degree, and DSB represents the benzoyl substitution degree);

$-10 \text{ nm} \leq Re(548) \leq 10 \text{ nm}$  Formula (III):

$Nz \geq 10$  Formula (IV):

(wherein Re(λ) represents the in-plane retardation at a wavelength of λ, and Nz=(nx−nz)/(nx−ny), wherein nx, ny and nz represent the refractive indexes in the film conveying direction, the direction perpendicular to the film conveying direction, and the thickness direction, respectively).

2. The optical film as claimed in claim 1, wherein the cellulose acylate film satisfies the following formula (V):

$0.35 \leq DSA \leq 1.5$.  Formula (V):

3. The optical film as claimed in claim 1, wherein the optically anisotropic layer A contains a rod-like liquid crystal compound.

4. The optical film as claimed in claim 1, wherein the optically anisotropic layer B contains a discotic liquid crystal compound.

5. The optical film as claimed in claim 1, wherein the cellulose acylate film, the optically anisotropic layer A and the optically anisotropic layer B are disposed in order in the optical film.

6. A liquid crystal display device comprising the following members in order:
    a polarizer;
    the optical film claimed in claim 1;
    a VA-mode liquid crystal cell;
    a second optical film; and
    a polarizer,
    wherein the low axis of the second optical film is at 45°±10° with respect to the film conveying direction and Re(548) is from 80 to 190 nm.

7. The liquid crystal display device as claimed in claim 6, which is a VA-mode liquid crystal display device fabricated by disposing a polarizing plate laminated with the optical film claimed in claim 1 on the viewing side of the liquid crystal display device.

8. An optical film comprising:
    an optical film C wherein a cellulose acylate film and an optically anisotropic layer c are stacked; and
    at least two layers of an optically anisotropic layer A and an optically anisotropic layer B,
    wherein
    Re(548) of the optical film C satisfies the range of 50 to 400 nm,
    Re(548) of the optically anisotropic layer A is from 80 to 190 nm and the slow axis of the optically anisotropic layer A is at 45°±10° with respect to the film conveying direction, and
    the optically anisotropic layer B satisfies the following formulae (III) and (IV):

$-10 \text{ nm} \leq Re(548) \leq 10 \text{ nm}$  Formula (III):

$Nz \geq 10$  Formula (IV):

(wherein Re(λ) represents the in-plane retardation at a wavelength of λ, and Nz=(nx−nz)/(nx−ny), wherein nx, ny and nz represent the refractive indexes in the film conveying direction, the direction perpendicular to the film conveying direction, and the thickness direction, respectively).

9. The optical film as claimed in claim 8, wherein the optically anisotropic layer c of the optical film C contains a discotic liquid crystal compound and the slow axis of the optical film C is at 0°±10° or 90°±10° with respect to the film conveying direction.

10. The optical film as claimed in claim 8, wherein the optically anisotropic layer A contains a rod-like liquid crystal compound.

11. The optical film as claimed in claim 8, wherein the optically anisotropic layer B contains a discotic liquid crystal compound.

12. The optical film as claimed in claim 8, wherein the cellulose acylate film, the optically anisotropic layer c, the optically anisotropic layer A and the optically anisotropic layer B are disposed in order.

13. A liquid crystal display device comprising the following members in order:
   a polarizer;
   the optical film claimed in claim 8;
   a VA-mode liquid crystal cell;
   a second optical film; and
   a polarizer,
   wherein the low axis of the second optical film is at 45°±10° with respect to the film conveying direction and Re(548) is from 80 to 190 nm.

14. The liquid crystal display device as claimed in claim 13, which is a VA-mode liquid crystal display device fabricated by disposing a polarizing plate laminated with the optical film claimed in claim 8 on the viewing side of the liquid crystal display device.

* * * * *